United States Patent
Endo

(10) Patent No.: US 9,743,031 B2
(45) Date of Patent: Aug. 22, 2017

(54) IMAGING DEVICE AND IMAGING METHOD

(71) Applicant: FUJIFILM Corporation, Tokyo (JP)

(72) Inventor: Hiroshi Endo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/054,341

(22) Filed: Feb. 26, 2016

(65) Prior Publication Data

US 2016/0182843 A1 Jun. 23, 2016

Related U.S. Application Data

(63) Continuation of application No. PCT/JP2014/073638, filed on Sep. 8, 2014.

(30) Foreign Application Priority Data

Sep. 27, 2013 (JP) .................. 2013-202082

(51) Int. Cl.
*H04N 5/335* (2011.01)
*H04N 5/378* (2011.01)
(Continued)

(52) U.S. Cl.
CPC ............. *H04N 5/378* (2013.01); *H04N 5/217* (2013.01); *H04N 5/2327* (2013.01);
(Continued)

(58) Field of Classification Search
CPC ....... H04N 5/378; H04N 5/217; H01L 27/307
(Continued)

(56) References Cited

U.S. PATENT DOCUMENTS 6,072,528 A 6/2000 Nakamura
2008/0266424 A1 10/2008 Asoma
(Continued)

FOREIGN PATENT DOCUMENTS

JP 64-039178 A 2/1989
JP 5-308578 A 11/1993
(Continued)

OTHER PUBLICATIONS

International Search Report (PCT/ISA/210) issued in PCT/JP2014/073638, mailed on Nov. 25, 2014.
(Continued)

*Primary Examiner* — Usman Khan
(74) *Attorney, Agent, or Firm* — Birch, Stewart, Kolasch & Birch, LLP

(57) ABSTRACT

This imaging device is equipped with an interchangeable optical system, and includes: a sensor section that has a configuration allowing nondestructive reading of a signal from each pixel; a reading section that reads a signal from the sensor section in a nondestructive manner for each pixel; a signal storage section that is able to add up and store the signals for each pixel; and a correction control section that acquires shading characteristics and controls the reading section and the signal storage section. Each pixel has an organic layer that includes a photoelectric conversion layer. On the basis of the shading characteristics, the correction control section sets the number of operations of signal reading of peripheral pixels such that the number is greater than the number of operations of signal reading of central pixels, and generates image data from the signal of each pixel stored in the signal storage section.

8 Claims, 12 Drawing Sheets

(51) Int. Cl.
  *H04N 5/217* (2011.01)
  *H04N 5/357* (2011.01)
  *H04N 9/04* (2006.01)
  *H04N 5/232* (2006.01)
(52) U.S. Cl.
  CPC ....... *H04N 5/23209* (2013.01); *H04N 5/3572* (2013.01); *H04N 9/045* (2013.01)
(58) Field of Classification Search
  USPC .......................................................... 348/294
  See application file for complete search history.

(56) References Cited

U.S. PATENT DOCUMENTS

| | | | |
|---|---|---|---|
| 2009/0087116 A1* | 4/2009 | Watarai | G06T 5/20 382/260 |
| 2009/0232407 A1* | 9/2009 | Aoyama | H04N 19/176 382/224 |
| 2011/0001823 A1* | 1/2011 | Dufour | G06K 9/3241 348/143 |
| 2012/0026370 A1 | 2/2012 | Oike et al. | |

FOREIGN PATENT DOCUMENTS

| | | |
|---|---|---|
| JP | 7-087409 A | 3/1995 |
| JP | 2006-115191 A | 4/2006 |
| JP | 2007-194687 A | 8/2007 |
| JP | 2008-271368 A | 11/2008 |
| JP | 2009-049870 A | 3/2009 |
| JP | 2011-205512 A | 10/2011 |
| JP | 2011-243704 A | 12/2011 |

OTHER PUBLICATIONS

Written Opinion (PCT/ISA/237) issued in PCT/JP2014/073638, mailed on Nov. 25, 2014.

* cited by examiner

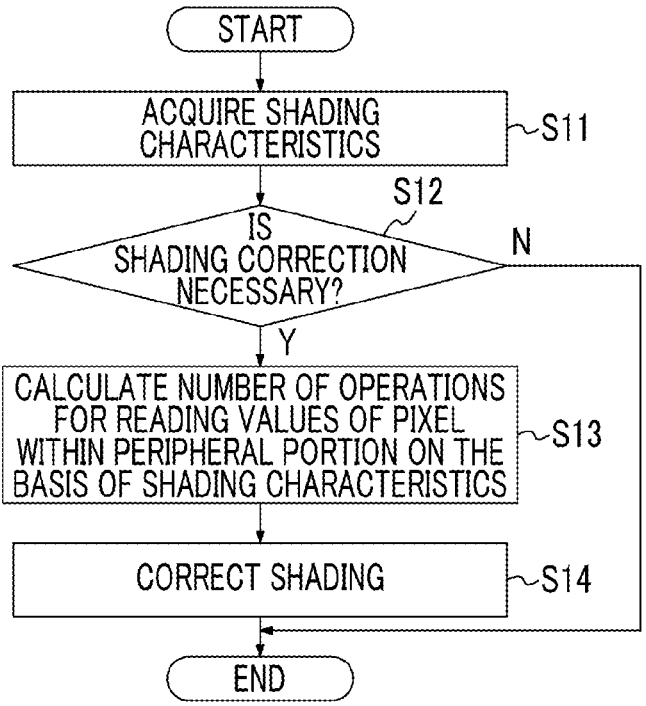
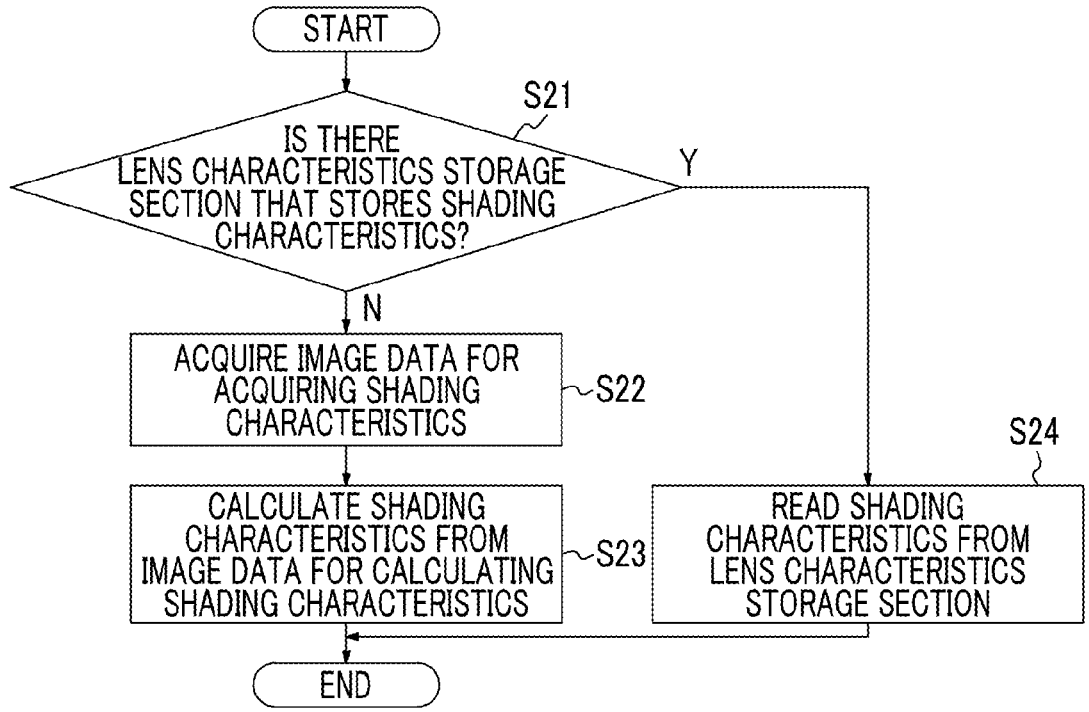

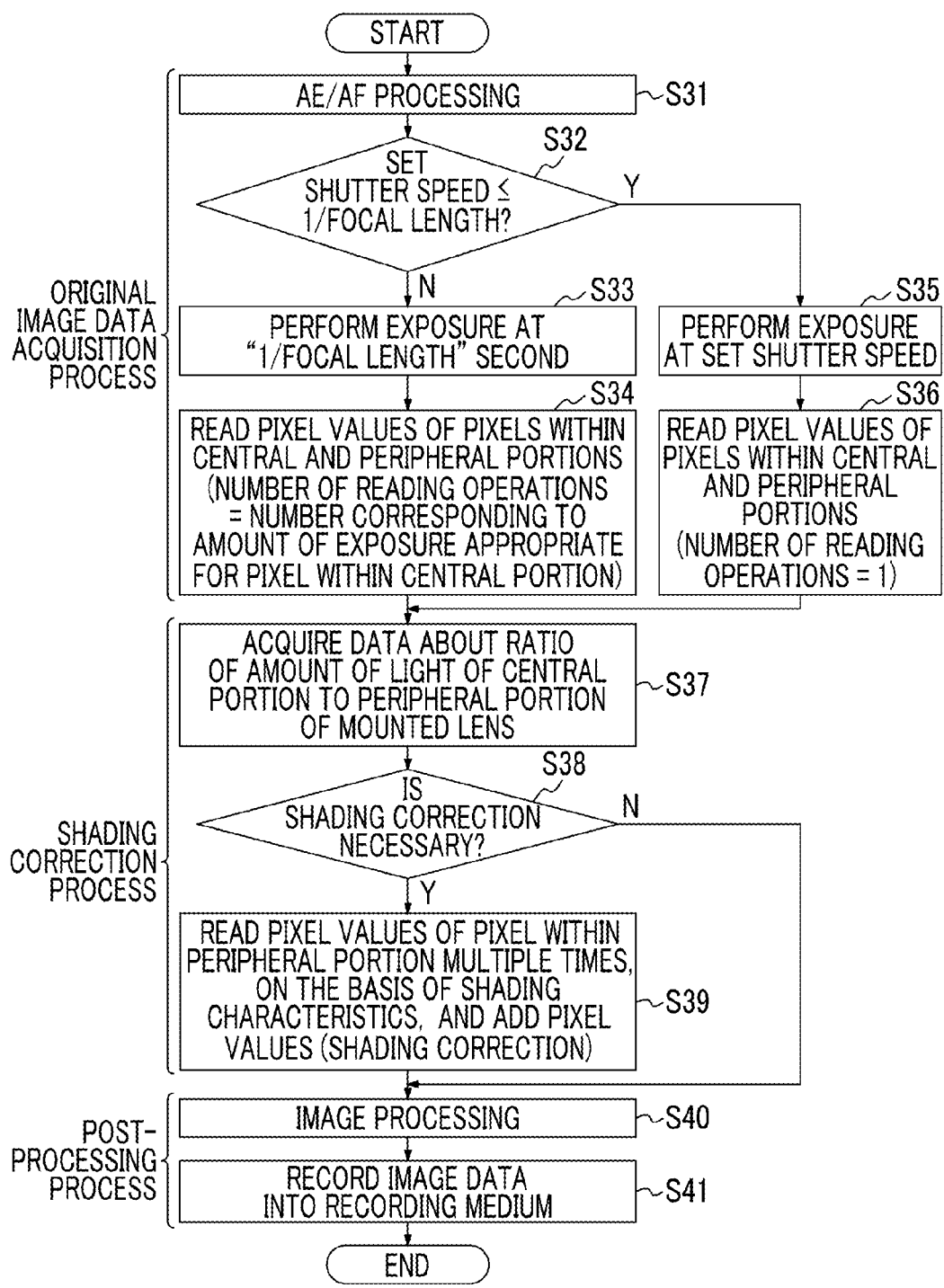

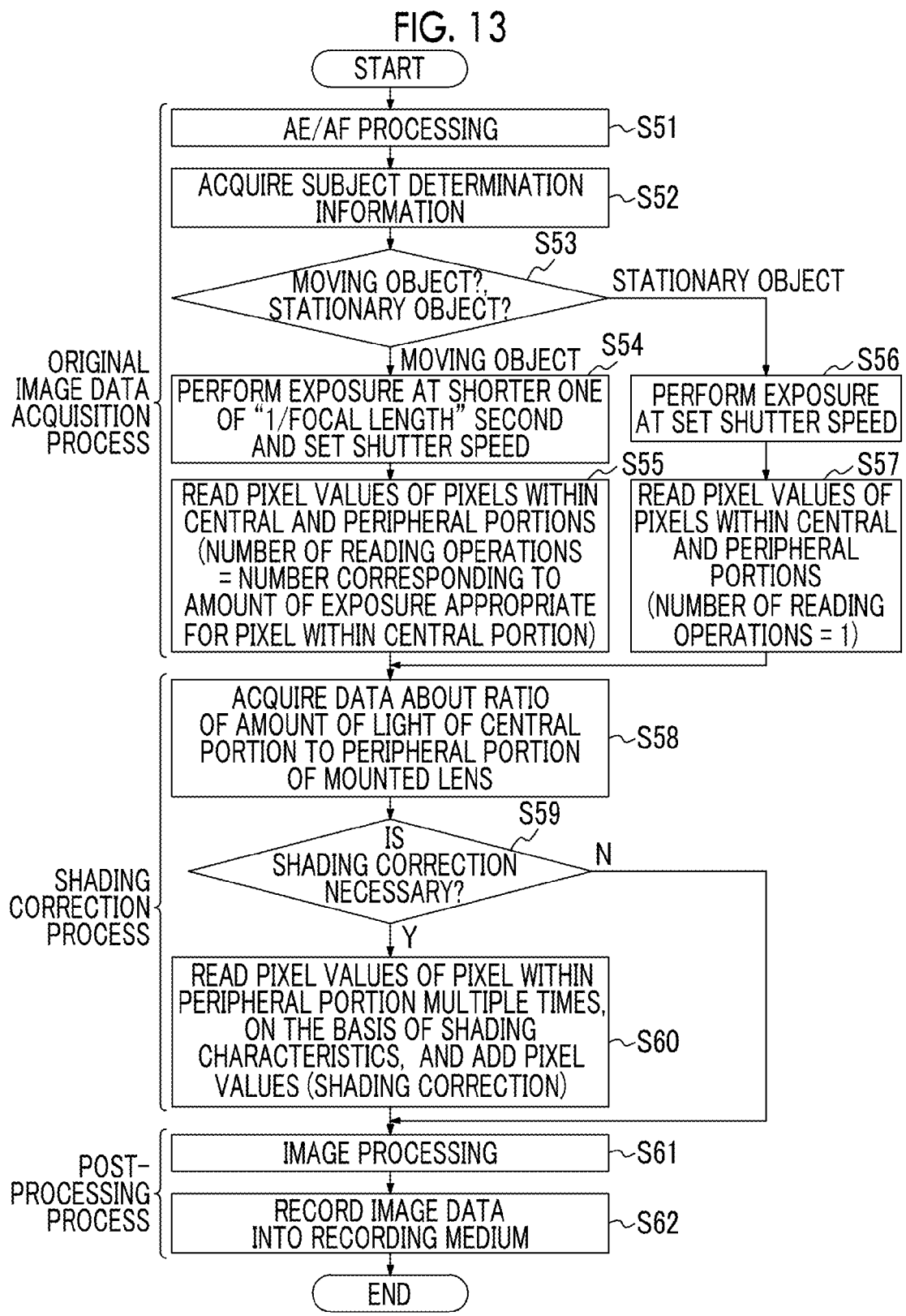

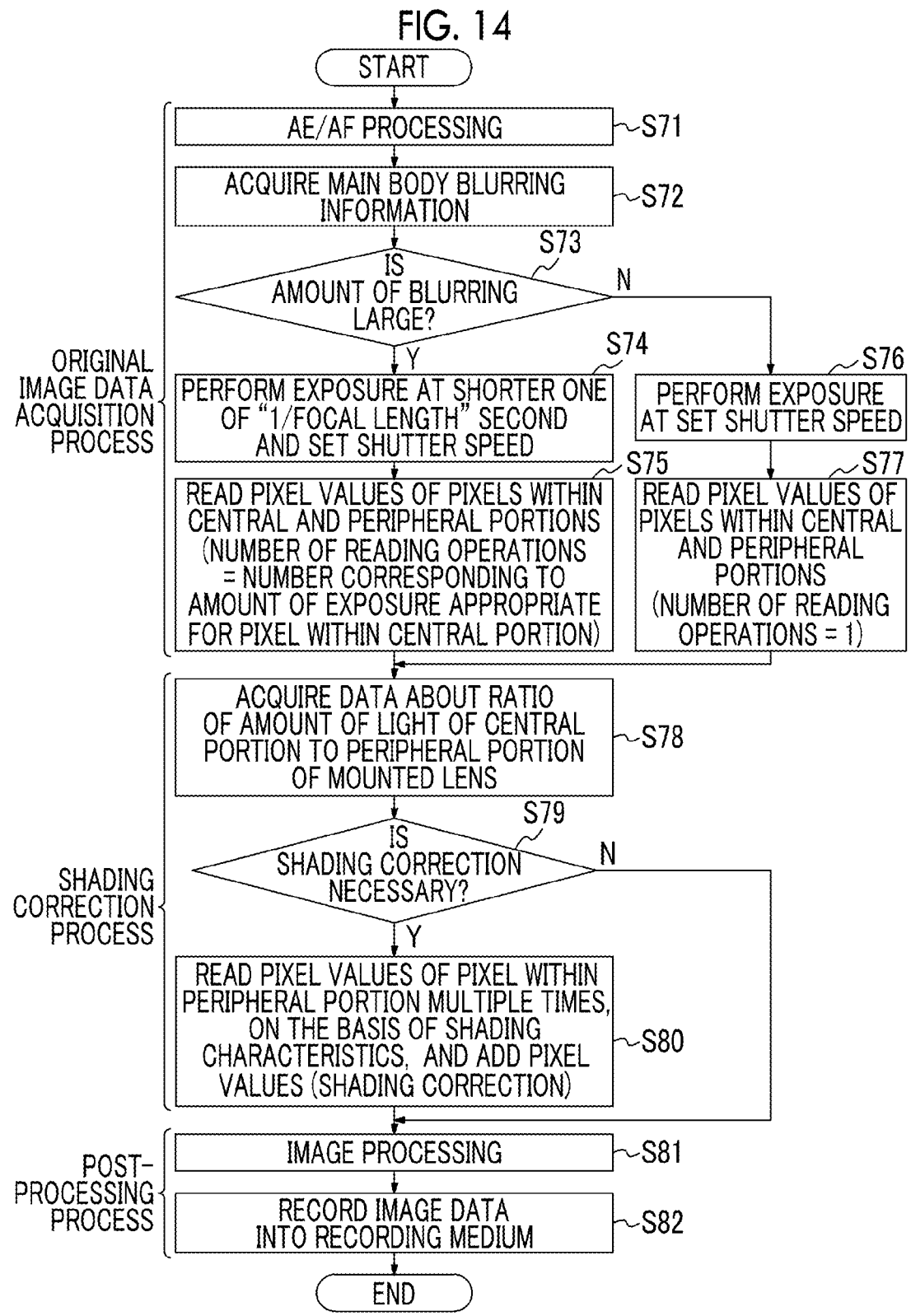

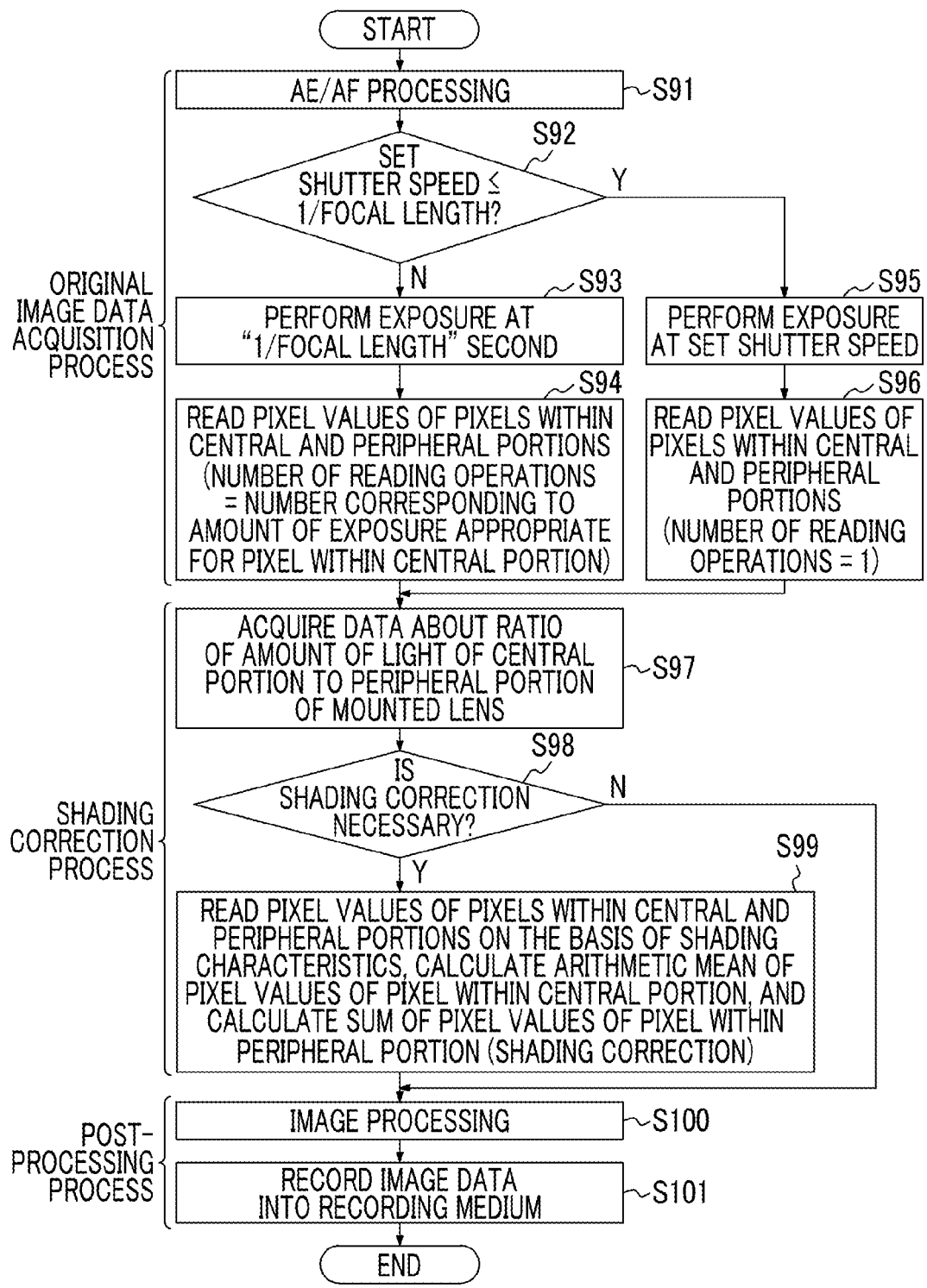

IMAGING DEVICE AND IMAGING METHOD

CROSS-REFERENCE TO RELATED APPLICATIONS

This application is a Continuation of PCT International Application No. PCT/JP2014/073638 filed on Sep. 8, 2014, which claims priority under 35 U.S.C. §119(a) to Japanese Patent Application No. 2013-202082 filed on Sep. 27, 2013. Each of the above applications is hereby expressly incorporated by reference, in their entirety, into the present application.

BACKGROUND OF THE INVENTION

1. Field of the Invention

The present invention relates to an imaging device and an imaging method, and particularly relates to a shading correction technology.

2. Description of the Related Art

In some cases, luminance unevenness (shading) may occur between a central portion and a peripheral portion of an image, which is captured by an imaging device such as a digital camera, due to characteristics of an optical system (such as a lens). Accordingly, there have been proposed various methods for correcting shading.

For example, JP2006-115191A discloses an imaging device including: accumulation start control means for controlling start of photoelectric charge accumulation of an imaging element; and accumulation end control means for controlling end of the accumulation of the imaging element by transmitting the photoelectric charge of the light receiving portion to a temporary accumulation section. In this imaging device, control timing of the accumulation start control means and/or the accumulation end control means is changed for each pixel or for each line, and a time period of accumulating photoelectric charge for each pixel or for each line is controlled, thereby correcting shading of a captured image.

JP-S64-039178A discloses an imaging device including an image sensor that is configured to perform photoelectric conversion on an optical image and perform nondestructive reading. In this imaging device, light signals of a single frame are read from the image sensor multiple times, and are sequentially added up, and an integrated output signal is output when the number of adding operations reaches a predetermined number. Thereby, a limitation of a Signal-Noise ratio (SN ratio) of an amount of light incident into the image sensor is improved, and thus high sensitivity is achieved.

In addition to the shading correction, there are proposed various imaging processing methods for improving image quality of a captured image.

For example, JP2008-271368A discloses an imaging device including: an imaging section that outputs a captured image signal formed of a long-exposure image signal and a short-exposure image signal; and a signal processing section that generates a synthesized image signal in which the long-exposure image signal and the short-exposure image signal are synthesized and which has a wide dynamic range. In this imaging device, exposure control is performed in accordance with a user setting exposure mode, and automatic exposure control for the short-exposure image signal is performed using luminance information of the synthesized image signal. Thereby, a problem of white color in the setting exposure mode is solved.

JP2011-243704A discloses a solid-state imaging device in which a gate electrode of the signal reading circuit includes a signal conversion transistor and the signal conversion transistor is connected to a photoelectric conversion section. This photoelectric-conversion-film-laminated-type solid-state imaging device prevents noise from being mixed with the signals at the time of electric charge accumulation.

SUMMARY OF THE INVENTION

In the conventional shading correction, by achieving an increase in gain of the signals (pixel values) of the pixels within the peripheral portion (an increase in amplification ratio), a decrease in amount of light in a peripheral portion is canceled out. Thereby, a problem of luminance unevenness occurring between a central portion and the peripheral portion of an image is solved.

However, since the increase in gain of the pixel values also causes an increase in noise components, in an image subjected to shading correction based on the gain control of the pixel values, image quality is lowered by the increased noise components. Accordingly, it is preferable that shading correction for suppressing deterioration in image quality is performed by suppressing the increase in noise components. In particular, in an interchangeable-lens-type imaging device, a lens (optical system) having various characteristics is mounted on a main body. Hence, it is preferable to apply shading correction flexibly compatible with various shading characteristics.

However, in conventional technologies such as JP2006-115191A, JP1989-039178A (JP-H01-039178A), JP2008-271368A, and JP2011-243704A mentioned above, it is difficult to achieve such shading correction. For example, in the imaging device described in JP2006-115191A, a photoelectric charge accumulation time period (exposure time period) is controlled. However, if the photoelectric charge accumulation time period is long, image blurring is noticeable, and image quality deteriorates. Likewise, even in the imaging device described in JP2008-271368A, if the exposure time period is long, image blurring is noticeable, and image quality deteriorates. Further, in JP1989-039178A (JP-S64-039178A) and JP2011-243704A, deterioration in image quality caused by shading is not considered at all.

The present invention has been made in consideration of the above-mentioned situation, and its object is to provide an image processing technology for achieving shading correction for suppressing deterioration in image quality caused by the increase in noise components and an image processing technology which can be flexibly applied to optical systems having various shading characteristics.

According to an aspect of the present invention, there is provided an imaging device that generates image data of an image of received light, the imaging device including: a sensor section that includes a plurality of pixels generating signals corresponding to the light received through the interchangeable optical system and that has a configuration allowing nondestructive reading of the signals generated by the plurality of pixels; a reading section that reads the signals of the respective pixels from the sensor section in a nondestructive manner; a signal storage section that is able to add up and store the signals of the respective pixels which are read by the reading section; and a control section that acquires shading characteristics of the optical system and controls the reading section and the signal storage section, in which each of the plurality of pixels has a color filter and an organic layer including a photoelectric conversion layer which generates electric charge corresponding to light received through the color filter, and in which the control section sets a ratio of a number of operations for reading the signals of a pixel within a central portion among the plurality of pixels to a number of operations for reading the signals of a pixel within a peripheral portion, on the basis of the shading characteristics, performs the setting such that the number of operations for reading the signals of the pixel within the peripheral portion is greater than the number of operations for reading the signals of the pixel within the central portion, and generates the image data from the signals of the respective pixels stored in the signal storage section.

According to the present aspect, the number of operations for reading the signals is set on the basis of the shading characteristics, and the image data is generated from the signals of the respective pixels stored in the signal storage section. Thus, it is possible to prevent image quality from deteriorating due to shading while preventing noise components from increasing. Further, the shading characteristics as a basis of the setting of the number of operations for reading the signals can be acquired in accordance with an interchangeable optical system. Thus, the shading correction technology according to the present aspect can be flexibly applied to various optical systems.

The imaging device of the present aspect is appropriate for so-called interchangeable-lens-type digital cameras and the like.

The "nondestructive reading" is a method of reading signals basically in a state where the signals (electric charge) of target pixels can be read repeatedly no matter how many times the reading is repeated. In this method, after the signal reading, electric charge, which can be stored in the target pixels, can be continuously held in the target pixels without being discharged. A specific configuration of a nondestructively readable sensor section is not particularly limited. For example, the following configuration may be made: each pixel has a capacitor for accumulating electric charge and electric charge held in the capacitor can be read repeatedly no matter how many times the reading is repeated. As such "a sensor section having the nondestructively readable configuration", for example, a complementary-metal-oxide-semiconductor (CMOS) type imaging element can be appropriately used. In particular, a CMOS-type imaging element having an organic layer according to the present aspect is also called "an organic CMOS sensor", has a high dynamic range, high sensitivity, and a wide light incidence area, and contributes to an increase in sensitivity of the sensor section, an increase in image quality, and a decrease in size.

The "shading characteristics of the optical system" is an arbitrary indicator which represents shading caused in accordance with the optical system, and can be represented by a data format which directly or indirectly indicates light attenuation distribution (luminance unevenness) based on shading.

The "pixel within the central portion" and the "pixel within the peripheral portion" can be appropriately set in consideration of the effect of luminance unevenness caused by shading, on the basis of a relative position relationship. Accordingly, the "pixel within the central portion" does not necessarily mean only "a single pixel (central pixel) at the center", and "the pixel within the central portion" may mean "the central pixel and a plurality of pixels around the pixel" which are less affected by the light attenuation caused by shading. Further, "the pixel within the peripheral portion" may mean pixels, which are more affected by the light attenuation caused by shading, among pixels (pixels positioned at relatively large distances from the central pixel) having relatively high image heights.

Preferably, the control section adds the signals of the pixel within the central portion for each of the pixels which are read multiple times, stores the signals in the signal storage section, and generates the image data from the signals of the respective pixels stored in the signal storage section.

According to the present aspect, the signals of the pixel within the central portion are also read multiple times, and are added and stored, thereby generating image data from the added and stored signals of the respective pixels. As a result, it is possible to suppress and reduce the effect of noise included in the signals of the pixel within the central portion.

Preferably, in the image data, data of each pixel within the central portion is based on an arithmetic mean value of the signals stored in the signal storage section, and data of each pixel within the peripheral portion is based on a sum of the signals stored in the signal storage section.

According to the present aspect, data of the pixel within the central portion can be acquired on the basis of the arithmetic mean value of the signals, and thus it is possible to reduce the effect of noise. Further, the data of the pixel within the peripheral portion can be acquired on the basis of the sum of the signals, and the number of adding operations is set in accordance with the shading characteristics. Thus, it is possible to reduce the effect of shading.

Preferably, the reading section is able to read the signals from only the pixel within the peripheral portion when reading the signals from the pixel within the peripheral portion.

According to the present aspect, when the signals are read from the pixel within the peripheral portion, it is not necessary to read signals from the pixel within the central portion. Thus, it is possible to prevent heat (noise) from occurring due to the reading of the signals.

As the sensor section capable of "reading signals from only the pixel within the peripheral portion", for example, a CMOS-type imaging element can be appropriately used.

Preferably, the control section acquires the shading characteristics from a lens characteristics storage section which stores the shading characteristics of the optical system.

According to the present aspect, it is possible to acquire the shading characteristics of the optical system from the lens characteristics storage section. It should be noted that the lens characteristics storage section can be arbitrarily disposed such that the control section is accessible thereto. For example, the lens characteristics storage section may be provided together with the optical system or the control section, and the lens characteristics storage section may be provided on an external device.

Preferably, the control section acquires the shading characteristics on the basis of the signals each of which is read from the sensor section for each pixel.

According to the present aspect, the shading characteristics of the mounted optical system can be acquired on the basis of the signals of the sensor section. Hence, even when an optical system of which shading characteristics are unclear is mounted, it is possible to acquire the shading characteristics of the optical system.

Preferably, the imaging device further includes a user interface, in which the control section controls the user interface such that the user interface prompts a user to capture an image for calculation of the shading characteristics, and calculates the shading characteristics on the basis of the image data of the image for calculation of the shading characteristics.

According to the present aspect, on the basis of an image for calculation of shading characteristics captured by a user, it is possible to acquire the shading characteristics of the optical system.

As this "image for calculation of shading characteristics", it is possible to use an arbitrary captured image. For example, as the "image for calculation of shading characteristics", a live view image or the like may be used.

Preferably, the control section reads the signals of a plurality of frames from the sensor section, and acquires the shading characteristics on the basis of the arithmetic mean values of the signals of the plurality of frames.

According to the present aspect, it is possible to precisely acquire shading characteristics on the basis of the arithmetic mean values of the signals corresponding to the plurality of frames.

The "signals corresponding to the plurality of frames" described herein are "signals constituting a plurality of images". The signals constituting each frame (each image) may be signals obtained from all pixels of the sensor section, and may be signals obtained from some pixels of the sensor section. However, it is preferable that the "signals corresponding to the plurality of frames" include the signals obtained from all pixels of the sensor section. For example, by adding the signals of the live view image having the plurality of frames and taking an arithmetic mean thereof, it is also possible to calculate the shading characteristics of the optical system.

According to another aspect of the present invention, there is provided an imaging method of generating image data of an image of light received through an imaging device including a sensor section that includes a plurality of pixels generating signals corresponding to the light received through an interchangeable optical system and that has a configuration allowing nondestructive reading of the signals generated by the plurality of pixels, a reading section that reads the signals of the respective pixels from the sensor section, and a signal storage section that is able to add up and store the signals of the respective pixels which are read by the reading section, the imaging method including: a step of acquiring shading characteristics of the optical system; a step of reading the signals from the sensor section and storing the signals in the signal storage section; and a step of generating the image data from the signals of the respective pixels stored in the signal storage section, in which each of the plurality of pixels has a color filter and an organic layer including a photoelectric conversion layer which generates electric charge corresponding to received light, and in which a ratio of a number of operations for reading the signals of a pixel within a central portion among the plurality of pixels to a number of operations for reading the signals of a pixel within a peripheral portion is set on the basis of the shading characteristics, and the setting is made such that the number of operations for reading the signals of the pixel within the peripheral portion is greater than the number of operations for reading the signals of the pixel within the central portion.

According to the present invention, the number of operations for reading the signals is set on the basis of the shading characteristics, and the image data is generated from the signals of the respective pixels stored in the signal storage section. Thus, it is possible to prevent image quality from deteriorating due to shading while preventing noise components from increasing.

Further, the shading characteristics as a basis of the setting of the number of operations for reading the signals can be acquired in accordance with an interchangeable optical system. Thus, the present invention can be flexibly applied to various optical systems.

BRIEF DESCRIPTION OF THE DRAWINGS

FIG. 10 is a flowchart illustrating a flow of shading correction processing.

FIG. 11 is a flowchart illustrating a flow of processing of acquiring shading characteristics of an optical system.

FIG. 12 is a flowchart illustrating an image processing process according to the first embodiment.

FIG. 13 is a flowchart illustrating an image processing process according to the second embodiment.

FIG. 14 is a flowchart illustrating an image processing process according to the third embodiment.

FIG. 15 is a flowchart illustrating an image processing process according to the fourth embodiment.

DESCRIPTION OF THE PREFERRED EMBODIMENTS

Figure 1A:
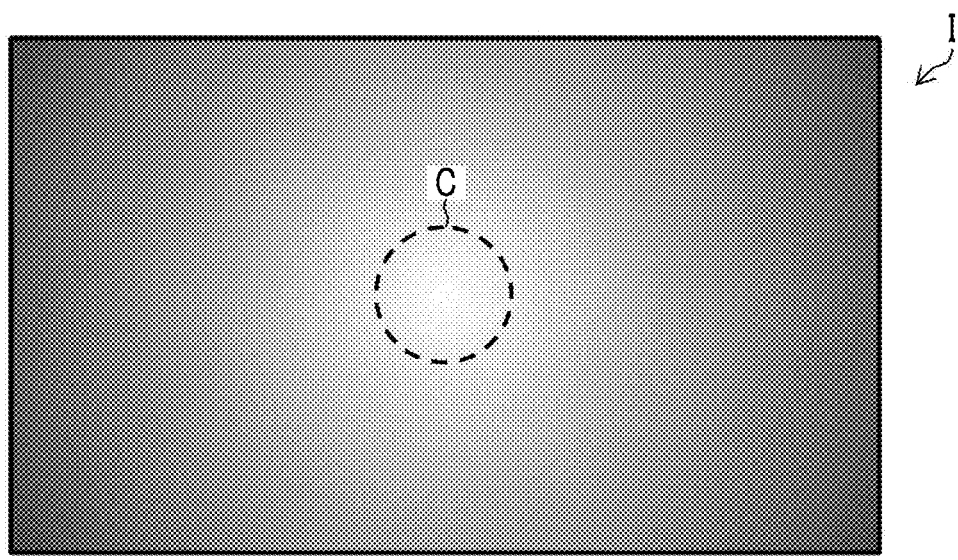
FIG. 1A is a diagram illustrating an example of an image for explaining shading.
Figure 1B:
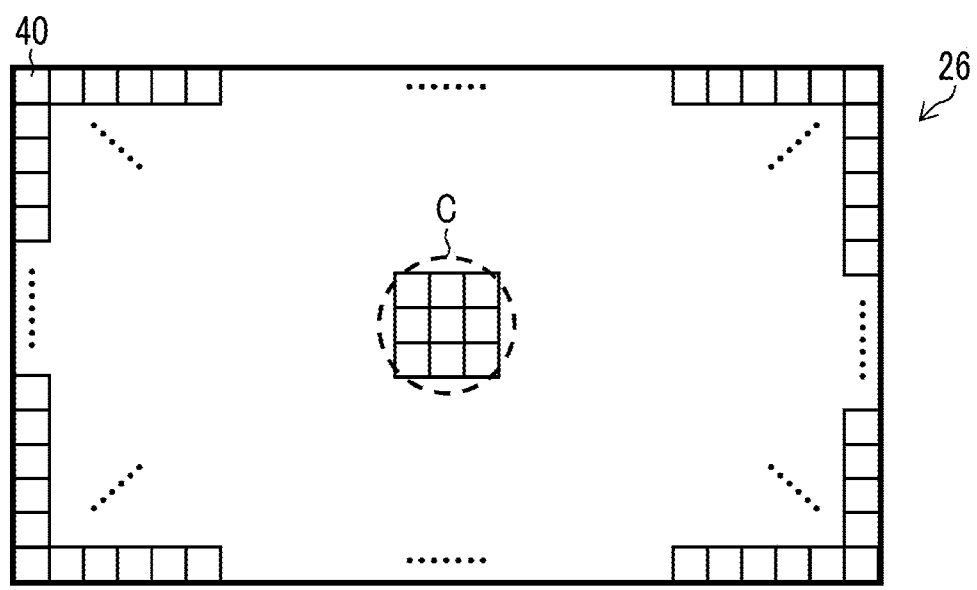
FIG. 1B is a plan view illustrating an imaging element (pixels).
Figure 2:
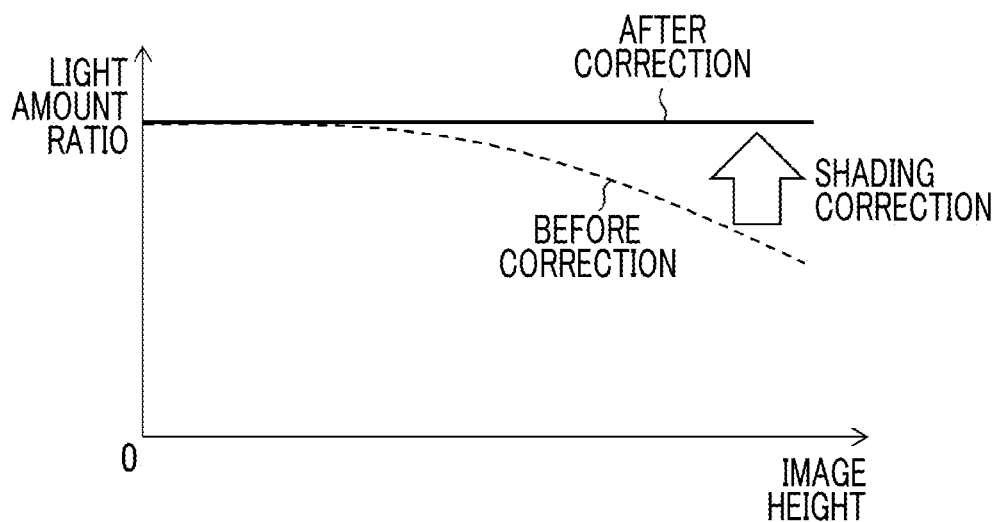
FIG. 2 is a graph illustrating an example of a relationship between a luminance (light intensity) of an image and an image height before and after the shading correction.

FIG. 1A is a diagram illustrating an example of an image for explaining shading. FIG. 1B is a plan view illustrating an imaging element (pixels). In FIG. 1A, the contrasting density represents contrast in the image I, where the less dense part (white part) is lighter, and the more dense part (black part) is darker. FIG. 1B shows only some of a plurality of pixels 40 of an imaging element (image sensor) 26, but the pixels 40 are two-dimensionally arranged to be continuously adjacent. FIG. 2 is a graph illustrating an example of a relationship between a luminance (light amount ratio) of an image and an image height before and after the shading correction. The X axis of FIG. 2 indicates an "image height"

(a distance from the image center), and the "O" of FIG. 2 indicates an image center position (image height=0). In contrast, the Y axis of FIG. 2 indicates a "light amount ratio" which is obtained by normalizing an amount of light for each image height of a captured image on the basis of a predetermined value (for example, an amount of light at the center position of the image).

The shading is a phenomenon that a degree of light attenuation according to the photography optical system changes in accordance with the image height due to optical characteristics of a photography optical system (lens section). Generally, a peripheral portion of a captured image becomes darker than a central portion (refer to "C" indicated by the dotted line of FIG. 1A) thereof. Shading correction is image processing for solving brightness unevenness (luminance unevenness) of the image caused by the shading. In addition, the shading correction is processing for increasing the brightness of the peripheral portion of the image on the basis of the brightness of the central portion of the image.

The shading changes depending on characteristics of the photography optical system. Thus, in accordance with the optical system used in actual photography, there are various degrees and appearances of the luminance unevenness caused by the shading. Accordingly, in order to perform shading correction appropriate for an image captured by an interchangeable-lens-type imaging device, it is necessary to detect shading characteristics of the optical system (interchangeable lens) used in actual photography and adjust the brightness of the image on the basis of the shading characteristics.

As a result of a keen examination, instead of the conventional method of increasing the signal gain of the peripheral pixels, the inventors newly found a method of summing up signals which are read by performing nondestructive reading multiple times on the signals from the peripheral pixels of the imaging elements, through a single exposure processing operation (a single process of image photography acquisition processing), using a nondestructively readable imaging element. The numbers (ratio) of operations for adding (summing up) the signals and operations of nondestructive reading from the central and peripheral pixels can be set in accordance with the shading characteristics of the photography optical system. Thus, the number of operations for adding the signals and the number of operations of nondestructive reading from the central pixels are set to be larger than those of the central pixels. Thereby, it is possible to precisely perform shading correction by achieving balance in brightness (luminance) between the peripheral and central portion of the image.

By reading the signals from the peripheral pixels multiple times and summing up the signals, pixel data of the peripheral pixels is obtained. In such a manner, noise components in the peripheral portion of the image are suppressed and reduced. Thereby, it is possible to obtain an image with high image quality. That is, when the signals (electric charge) are read n times from the imaging element and integrated (added), the magnitudes of the signals becomes n times, while random noise (such as amplifier noise) is reduced. Thus, the SN ratio is improved as a whole. In particular, the imaging element having an organic thin film and a capacitor may be used, and noise (such as noise caused by thermal excitation) mixed with electric charge (electrons) accumulated in the capacitor of each pixel may be small enough to be negligible. In this case, the main component of the noise becomes amplifier noise, and thus the effect of noise suppression performed by reading the signals multiple times and summing up the signals is further improved. Further, by adopting a method of reading pixel signals in a nondestructive manner and a method of integrating the signals, it is possible to effectively prevent image quality from being deteriorated by shading without increasing noise in a short exposure time period.

It should be noted that the method of reading the signals (electric charge) from the respective pixels of the imaging element includes a "destructive reading method" and a "nondestructive reading method". In the destructive reading method, one electric charge is read from each target pixel, electric charge stored in the pixel is discharged (reset), and the electric charge (signal) stored until the reading cannot be read again from the target pixel. In contrast, in the nondestructive reading method, the electric charge stored in the target pixel can be repeatedly read basically no matter how many times the reading is repeated. For example, by adopting a configuration in which the capacitor for accumulating the electric charge is provided for each pixel and the electric charge held in the capacitor can be read multiple times not matter how many times the reading is repeated, it is possible to implement the nondestructive reading method.

Further, the inventors of the present invention found the following fact. The effect of improving image quality through shading correction is enhanced by combining the above-mentioned shading correction technology and the nondestructive reading imaging element formed by not silicon photodiodes but light receiving portions having an "organic thin film".

The silicon photodiode is characterized in that ray angle dependency of the intensity of the obtained signal is relatively high and an angle of received light is limited. Accordingly, the effect of shading in the image captured by the CMOS sensor having the silicon photodiodes changes in accordance with combination between the imaging element (silicon photodiode) and the photography optical system. Hence, in order to precisely correct shading of the image captured by the imaging element using the silicon photodiodes, it is necessary to perform shading correction in which characteristics of both the photography optical system and the imaging element are reflected.

In contrast, the organic thin film, of which a light absorption coefficient is large, is characterized in that ray angle dependency of the intensity of the obtained signal is excessively small and an angle of received light is wide. Accordingly, the effect of shading in the image captured by the imaging element (such as the organic CMOS sensor) having the organic thin film primarily depends on characteristics of the photography optical system. Thus, it is possible to perform effective shading correction on the basis of only the characteristics of the photography optical system without consideration of sensor characteristics. In addition, even when the organic CMOS sensor is used, it is possible to perform shading correction by increasing the signal gain of the peripheral pixels such that the gain is greater than that of the central pixels. Even in this case, the gain value can be determined on the basis of only the shading characteristics of the photography optical system.

In addition, in the past, a technology, in which luminance shading of the image captured by the above-mentioned organic CMOS sensor is considered, and a shading correction technology, which uses characteristics of an organic CMOS sensor to be described later, have not been proposed.

Hereinafter, an interchangeable-lens-type imaging device according to the above-mentioned shading correction technology will be described.

Figure 3:
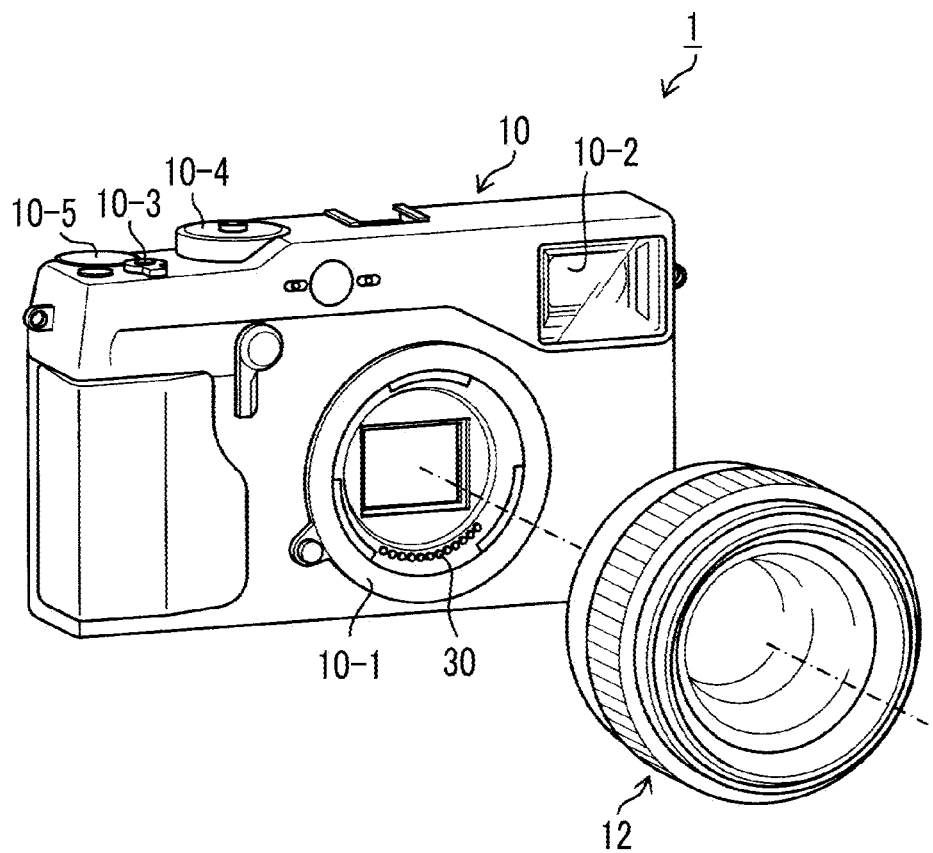
FIG. 3 is a perspective view of an imaging device according to an embodiment of the present invention as viewed obliquely from the front.
Figure 4:
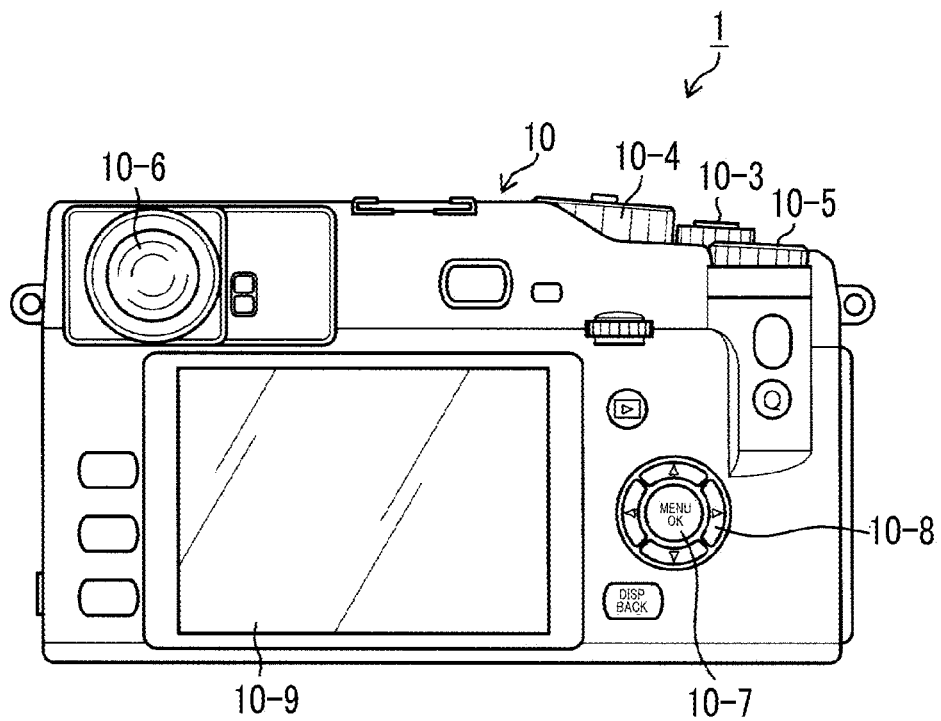
FIG. 4 is a rear view of the imaging device shown in FIG. 3.

FIG. 3 is a perspective view of an imaging device (digital camera) according to an embodiment of the present invention as viewed obliquely from the front. FIG. 4 is a rear view of the imaging device shown in FIG. 3.

The imaging device 1 of the present example includes a camera main body 10 and an interchangeable lens unit 12 (optical system) that is detachably mounted on the camera main body 10, and generates image data of an image of received light of a subject.

A mount 10-1 on which the interchangeable lens unit 12 is mounted, a finder window 10-2 of an optical finder, and the like are provided on the front of the camera main body 10. A shutter release button 10-3, a shutter speed dial 10-4, an exposure correction dial 10-5, and the like are provided on the upper surface of the camera main body 10. An eyepiece section 10-6 of the optical finder, a MENU/OK button 10-7, an arrow key 10-8, a liquid crystal monitor 10-9, and the like are provided on the rear surface of the camera main body 10.

The liquid crystal monitor 10-9 functions as an image display section that displays a captured image (such as a live view image in a photography mode and a captured image in a reproduction mode), and functions as an operation instruction display section that displays various menu screens. The MENU/OK button 10-7 is an operation section having both a function as a menu button to give a command to display a menu screen on the liquid crystal monitor 10-9 and a function as an OK button to give a command to confirm and execute selected contents. The arrow key 10-8 is an operation section to input instructions of four directions of up, down, right, and left, and functions as a button that gives an instruction to select various setting items from the menu screen displayed on the liquid crystal monitor 10-9. Further, the up/down key of the arrow key 10-8 functions as a zoom switch at the time of photography or a reproduction zoom switch in the reproduction mode, and the right/left key functions as a frame advance (forward-direction/opposite-direction advance) button in the reproduction mode.

Figure 5:
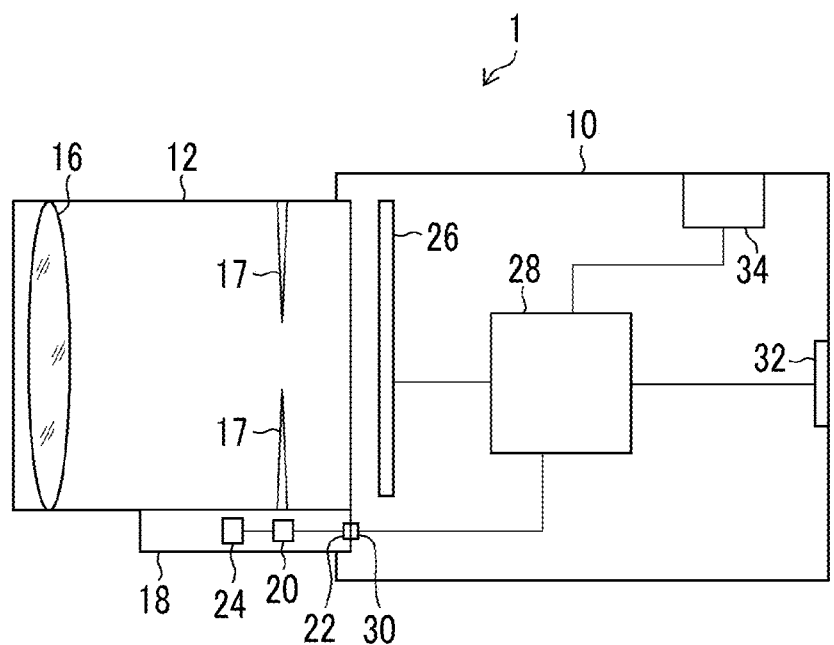
FIG. 5 is a block diagram illustrating a configuration example of an imaging device (digital camera).

FIG. 5 is a block diagram illustrating a configuration of the entirety of the information processing apparatus 1. The camera main body 10 and the interchangeable lens unit 12 of the imaging device 1 are electrically connected through a camera main body input/output section 30 of the camera main body 10 and a lens unit input/output section 22 of the interchangeable lens unit 12, and are able to transmit and receive signals.

The interchangeable lens unit 12 has an optical system including a lens 16, a diaphragm 17, and the like, and an optical system operation section 18 that controls the optical system. The optical system operation section 18 includes a lens unit controller 20 connected to the lens unit input/output section 22 and an actuator (not shown in the drawing) that operates the optical system.

The lens unit controller 20 controls the optical system (such as the lens 16 and the diaphragm 17) through the actuator on the basis of control signals sent from the camera main body 10 through the lens unit input/output section 22, and performs, for example, focus control and zoom control based on lens movement, aperture amount control of the diaphragm 17, and the like. Further, the lens unit controller 20 transmits characteristics of the optical system to the camera main body 10 in response to the control signal (request command) which is sent from the camera main body 10 (main body controller 28) through the lens unit input/output section 22.

The lens unit memory 24 holds data of characteristics of the interchangeable lens unit 12, and the lens unit controller 20 sends the data of the characteristics held in the lens unit memory 24 to the main body controller 28 of the camera main body 10. In particular, the lens unit memory 24 of the present example holds various types of data indicating the shading characteristics of the interchangeable lens unit 12 (optical system), and data of the shading characteristics is transmitted from the lens unit memory 24 to the main body controller 28 as necessary.

On the other hand, the camera main body 10 includes an imaging element 26, the main body controller 28, a camera main body input/output section 30, an input/output interface 32, a user interface 34, and the like.

The imaging element 26 includes a plurality of pixels 40 (refer to FIG. 1B), and each pixel has a color filter of RGB of the like and an image sensor. Each pixel 40 generates an electrical signal in response to light which is received through the optical system (such as the lens 16 and the diaphragm 17) of the interchangeable lens unit 12, and sends an image signal (original image data) to the main body controller 28. The imaging element 26 of the present example is formed by an organic CMOS sensor. Each pixel 40 has a color filter and an organic layer that includes a photoelectric conversion layer generating electric charge in response to the light received through the color filter. The imaging element has a configuration allowing nondestructive reading of the electric charge (signal) generated by each pixel 40. A specific configuration of the imaging element 26 will be described later.

The input/output interface 32 is a section that relays interchange of information between the imaging device 1 (the camera main body 10 and the main body controller 28) and external devices (such as a computer, a server, and a mobile device). For example, various types of data of the imaging device 1 (the camera main body 10 and the interchangeable lens unit 12) and image data before and after image processing are transmitted and received between the imaging device 1 and the external devices through the input/output interface 32. In addition, an aspect of connection of the external devices to the input/output interface 32 is not particularly limited. For example, both wired connection and wireless connection may be used.

A format of image data, which is sent from the imaging device 1 (main body controller 28) to the external devices, is not particularly limited, and may be an arbitrary format such as a RAW, a joint photographic coding experts group (JPEG), a tagged image file format (TIFF), or the like. Consequently, the main body controller 28 may associate a plurality of related data pieces with each other so as to form a single image file, and may transmit the image file to the external devices. The related data pieces include, like so-called exchangeable image file format (Exif), header information (photography information (photography date and time, a device type, a pixel number, an aperture value, and the like) and the like), main image data, and thumbnail image data, and the like.

The user interface 34 is a section that relays interchange of information between a user and the imaging device 1 (the camera main body 10 and the main body controller 28), and for example, performs various displays for the user or receives an instruction from the user. For example, the respective sections (such as the finder window 10-2, the shutter release button 10-3, the shutter speed dial 10-4, the exposure correction dial 10-5, the eyepiece section 10-6, the MENU/OK button 10-7, the arrow key 10-8, and the liquid crystal monitor 10-9) shown in FIGS. 3 and 4 function as the user interface 34.

The main body controller 28 integrally controls the imaging device 1, thereby functioning as a device control section that controls various devices of the camera main body 10 and the interchangeable lens unit 12, and functioning as an image processing section that performs various kinds of image processing on the image captured by the imaging element 26. The main body controller 28 performs various kinds of control (such as photography control, image processing control, image data recording/reproduction control, control of display of an image (live view image), and control of display of a liquid crystal monitor (LCD: Liquid Crystal Display)), on the basis of an operation signal sent from a user through the user interface 34 and an operation signal sent from the external devices through the input/output interface 32.

Accordingly, the main body controller 28 controls, for example, an output of the image signals sent from the imaging element 26, generates a control signal for controlling the interchangeable lens unit 12 and transmits the signal to the interchangeable lens unit 12 (lens unit controller 20) through the camera main body input/output section 30, and transmits image data before and after image processing to the external devices connected through the input/output interface 32. Further, the main body controller 28 performs arbitrary image processing on the image signals sent from the imaging element 26 as necessary. For example, the main body controller 28 appropriately performs various kinds of image processing such as sensor correction processing, demosaic (synchronization) processing, pixel interpolation processing, color correction processing (offset correction processing, white balance processing, color matrix processing, gamma conversion processing, and the like), RGB image processing (sharpness processing, tone correction processing, exposure correction processing, outline correction processing, and the like), RGB/YCrCb conversion processing, and image compression processing. In particular, the main body controller 28 of the present example performs shading correction on the image signals (original image data) as described later. The shading correction will be described in detail.

The main body controller 28 has an AE detection section and an AF detection section (not shown in the drawing), and performs automatic exposure (AE) processing and auto focus (AF) processing.

When the shutter release button 10-3 is pressed down to a first stage (pressed halfway), an AE operation is started. Then, the main body controller 28 sends the image signals (digital signals) from the imaging element 26 to the AE detection section. The AE detection section sums up the digital signals corresponding to the entire screen, or sums up the digital signals which are differently weighted between the screen central portion and the peripheral portion. The main body controller 28 calculates a brightness (photography exposure value (EV)) of a subject from the value of summation, and determines an aperture value (F number) and an electronic shutter (shutter speed) on the basis of the photography EV value, in accordance with a predetermined program diagram. The main body controller 28 controls the diaphragm 17 on the basis of determined aperture value, and controls a time period of electric charge accumulation in the imaging element 26 on the basis of the determined shutter speed. Meanwhile, the AF detection section is able to calculate a value, which is obtained through the summation, as an AF evaluation value by summing up absolute values of high-frequency components of the digital signals which are received when the shutter release button 10-3 is pressed halfway and correspond to an AF area. The main body controller 28 moves a focus lens (not shown in the drawing) of the interchangeable lens unit 12 toward the infinity, searches for an in-focus position at which the AF evaluation value is at the maximum, and moves the focus lens to the in-focus position, thereby being able to perform focus adjustment on a subject (main subject).

When the AE operation and the AF operation end and the shutter release button 10-3 is pressed down to a second stage (pressed fully), the main body controller 28 acquires the digital signals from the imaging element 26 in response to the full pressing, and temporarily stores the signals in a memory (not shown in the drawing). In the main body controller 28, the digital signals temporarily stored are appropriately read, various kinds of signal processing (image processing) are performed, and processed luminance data Y and color difference data Cr and Cb are stored as image data in the memory again. The main body controller 28 performs compression processing on the luminance data Y and color difference data Cr and Cb stored in the memory, in accordance with the format such as JPEG, adds necessary supplementary information such as photography date and time and photography conditions to the compressed image data, and records the image data into a recording medium (not shown in the drawing) such as a memory card.

In addition, each controller (the lens unit controller 20 and the main body controller 28) includes circuits necessary for control processing. For example, the controller may have a calculation processing circuit (such as central processing unit (CPU)), the memory, and the like.

<Imaging Element>

Figure 6:
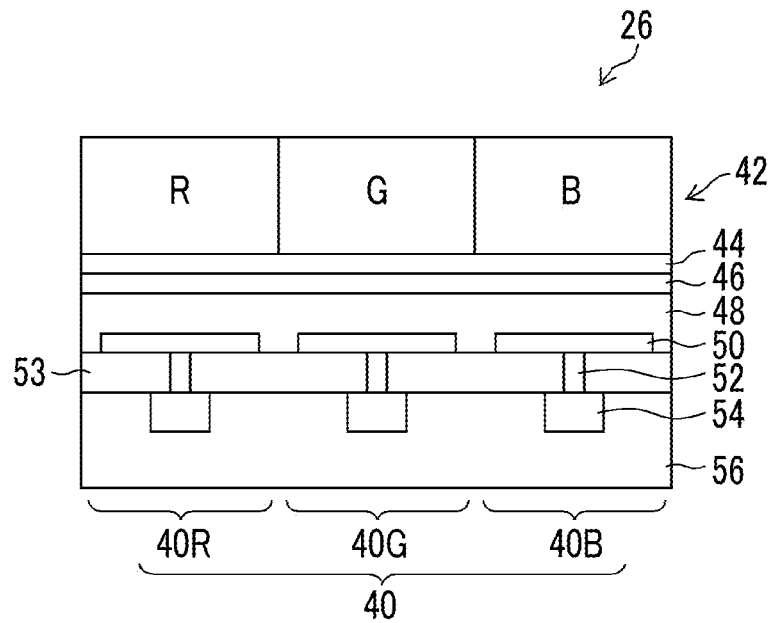
FIG. 6 is a sectional view illustrating a configuration example of the imaging element, and shows some of a plurality of pixels (3 pixels) constituting the imaging element.

FIG. 6 is a sectional view illustrating a configuration example of the imaging element 26, and shows some of a plurality of pixels (3 pixels) constituting the imaging element 26.

The imaging element 26 of the present example is formed of an organic CMOS sensor having an organic photoelectric conversion film and a CMOS signal reading substrate, and includes respective pixel groups of R pixels 40R, G pixels 40G, and B pixels 40B. The pixel 40 has a configuration in which a color filter 42, an intermediate layer 44, a common electrode 46, an organic layer 48, an individual electrode 50, a via-plug 52, an insulation layer 53, a reading section 54, and a CMOS substrate 56 are sequentially laminated. In this laminated body, the color filter 42, the individual electrode 50, the via-plug 52, and the reading section 54 are provided for each pixel, but the intermediate layer 44, the common electrode 46, the organic layer 48, the insulation layer 53, and the CMOS substrate 56 are provided to be common to the plurality of pixels 40.

The CMOS substrate 56 is a semiconductor substrate such as a glass substrate or a silicon (Si) substrate, and a reading section 54 including a capacitor is provided as a CMOS circuit on the CMOS substrate 56. The insulation layer 53 is formed on the CMOS substrate 56, and the plurality of individual electrodes 50 is formed on a surface of the insulation layer 53. The individual electrode 50 and the reading section 54 are connected through the via-plug 52 penetrating the insulation layer 53 for each pixel.

The organic layer 48 is constituted by a panchromatic photosensitive organic photoelectric conversion film as a thin film. The organic photoelectric conversion film (organic layer 48) is a structure-free continuous film which has basically no limitation in structure, and can be provided on the CMOS substrate 56 where the reading section 54 is provided. Consequently, the organic layer 48 of the present example does not need expensive microfabrication process required for silicon technology, and is appropriate for pixel miniaturization.

The common electrode 46 is an electrode which facing the individual electrodes 50 with the organic layer 48 interposed therebetween, and is formed of a conductive material which is transparent to incident light. The light incident from the color filter 42 onto the common electrode 46 can be made to be transmitted through the common electrode 46 and reach the organic layer 48. The voltage supply section (not shown in the drawing) applies a voltage between the common electrode 46 and the individual electrodes 50. In a state where the voltage is applied, when light is incident into the organic layer 48, in the organic layer 48, electric charge corresponding to an amount of received light is generated. The individual electrodes 50 function as electrodes for collecting the electric charge generated in the organic layer 48.

The intermediate layer 44 includes a buffer layer that is formed on the common electrode 46, and a sealing layer that is formed between the buffer layer and the color filters 42.

Each color filter 42 is a filter for transmitting light in a specific wavelength region but blocking light in the other wavelength region, and the R pixel 40R is provided with a red color filter 42, the G pixel 40G is provided with a green color filter 42, and the B pixel 40B is provided with a blue color filter 42. Arrangement pattern of the color filters 42 with respective colors is not particularly limited. For example, the color filters 42 may be arranged in various patterns such as a Bayer array, a G stripe R/G full-checkered pattern, an X-Trans (registered trademark) array, or a honeycomb array. Further, colors (transmission wavelength region) of the color filters are not particularly limited. For example, a transparent (white) filter or a filter with another color such as emerald may be used as the color filter 42.

The organic layer 48 has a high light absorption coefficient and excessively mall ray angle dependency, and is this formed to be excessively thin. Accordingly, in the organic CMOS sensor employing the organic layer 48, "mixture of electric charge into the adjacent pixels" caused by the CMOS sensor employing silicon photodiodes is less likely to occur. For example, in a back-illuminated-type silicon photodiode CMOS sensor, a light absorption coefficient of silicon (Si) is low, and thus obliquely incident light may penetrate into the adjacent pixels. Further, a part of electric charge generated on the irradiated surface may move horizontally while the electric charge reaches the reading section on the rear side, and may be read by the reading sections of the adjacent pixels. However, since the organic CMOS-type imaging element 26 of the present example uses the organic layer 48 of which the light absorption coefficient is high, such mixture of electric charge into the adjacent pixels is less likely to occur in principle, and high-accuracy image photography can be performed.

Figure 7:
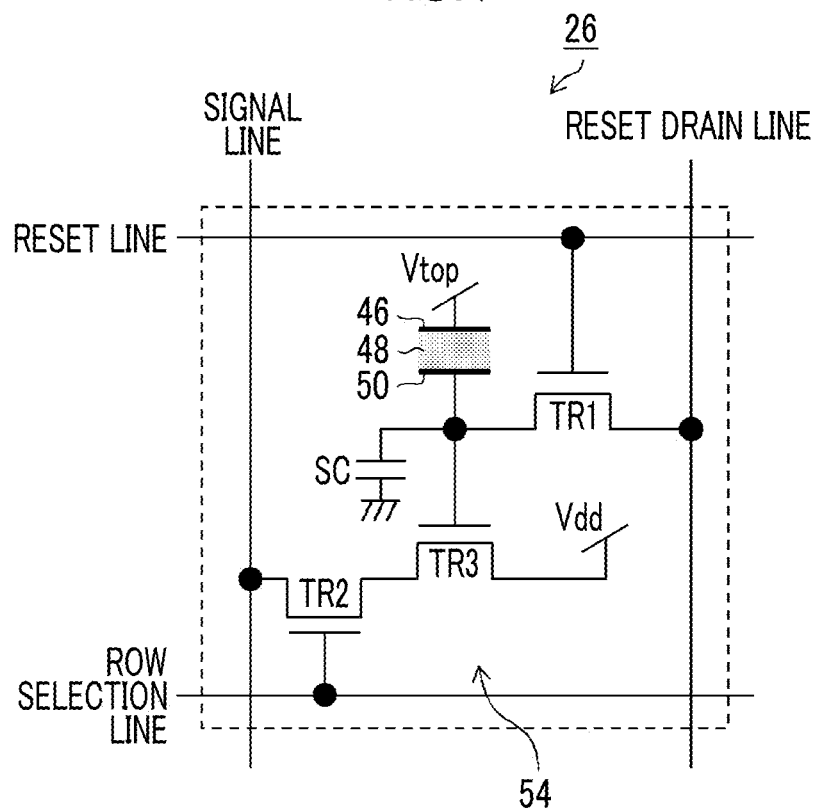
FIG. 7 is a circuit diagram of the imaging element, and shows circuit configuration examples of mainly a sensor section (a common electrode, an organic layer, and an individual electrode) and a reading section for reading the signals for each pixel from the sensor section in a nondestructive manner.

FIG. 7 is a circuit diagram of the imaging element 26, and shows circuit configuration examples of mainly the sensor section (the common electrode 46, the organic layer 48, and the individual electrode 50) and the reading section 54 for reading the signals for each pixel from the sensor section in a nondestructive manner. In addition, FIG. 7 illustrates a single reading section 54 which is provided for each pixel.

The reading section 54 of the present example employs a CMOS circuit which is able to repeatedly read a signal corresponding to accumulated electric charge in a nondestructive manner, and includes a capacitor SC and transistors TR1, TR2, and TR3, and the like. The CMOS circuit structure is excellent in reduction in noise and an increase in speed of signal reading, and implements a method of reading signals in a nondestructive manner with a simple configuration.

When light is incident onto the organic layer 48 in a state where a voltage Vtop is applied between the individual electrode 50 and the common electrode 46, the electric charge corresponding to the amount of incident light is generated in the organic layer 48. The electric charge generated in the organic layer 48 is collected by the individual electrode 50, and accumulated in the capacitor SC.

The reset line is for turning on/off a transistor TR1. When a gate of the transistor TR1 is turned on in response to the signal of the reset line, the electric charge accumulated in the capacitor SC is discharged to the reset and drain lines through the transistor TR1, and is reset to zero.

Row selection signals are applied to row selection lines from a vertical driver to be described later, and signals corresponding to electric charges accumulated in the respective capacitors SC are output to the signal lines from the reading sections 54 in a single row corresponding to the row selection line to which the row selection signal is applied. That is, the voltage corresponding to electric charge accumulated in the capacitor SC is output as a signal to the signal line through a source follower amplifier formed of the transistor TR2 and the transistor TR3.

Figure 8:
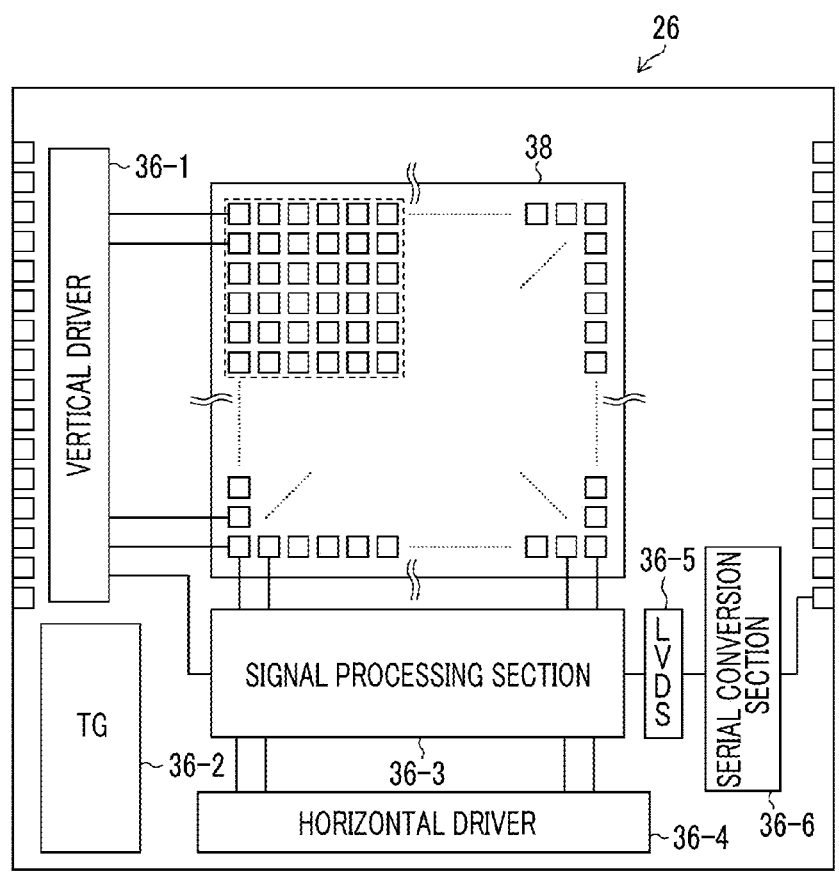
FIG. 8 is a diagram illustrating configuration examples of the imaging element and peripheral circuits thereof.

FIG. 8 is a diagram illustrating configuration examples of the imaging element 26 and peripheral circuits thereof.

The imaging element 26 has a pixel region 38 in which the plurality of pixels 40 are two-dimensionally arranged, a vertical driver 36-1, a timing generator 36-2, a signal processing section 36-3, a horizontal driver 36-4, a low voltage differential signaling (LVDS) 36-5, and a serial conversion section 36-6.

The timing generator 36-2 supplies a timing signal for driving the imaging element 26, and performs reading control of thinning-out reading, partial reading, and the like. The signal processing section 36-3 is provided to correspond to respective columns of the reading sections 54. The vertical driver 36-1 selects the reading sections 54 in a single row, and reads the signals from the selected reading sections 54. The signal processing section 36-3 performs correlated double sampling (CDS) processing on the signals, which are read by the vertical driver 36-1 and are output from the reading sections 54 of the respective columns, corresponding to the single row, and converts the processed signals into digital signals. The signals processed by the signal processing section 36-3 are stored in a memory, which is not shown in the drawing, for each column. The horizontal driver 36-4 performs control to sequentially read the signals, which are stored in the memory of the signal processing section 36-3, corresponding to the single row and to output the signals to the LVDS 36-5. The digital signals are transmitted to the serial conversion section 36-6 in accordance with the LVDS 36-5, and the serial conversion section 36-6 converts the input parallel digital signals into serial digital signals, and outputs the signals.

It should be noted that the serial conversion section 36-6 may be omitted. Further, the following configuration may be adopted: the signal processing section 36-3 performs only the correlated double sampling processing, and an AD conversion section (analog/digital conversion section) is provided instead of the LVDS 36-5. Furthermore, the following configuration may be adopted: the signal processing section 36-3 performs only the correlated double sampling processing, and the LVDS 36-5 and the serial conversion section 36-6 are omitted.

As described above, the organic CMOS-type imaging element 26 of the present example has a structure in which silicon photodiodes of a normal CMOS sensor are moved to an organic photoelectric conversion film (organic layer 48), and thus electrons generated in the organic layer 48 are accumulated in a capacitor, and an electric potential of the capacitor is amplified by an amplifier, and the potential is detected. However, in a conventional imaging element, due to the effect of the surface structure of the sensor, the angle of received light is limited. In contrast, in the organic CMOS-type imaging element 26 of the present example, the organic layer 48 performs photoelectric conversion, and thus there is a merit in that the angle of received light is rarely limited.

In the photography mode of the imaging device 1, subject light is imaged on a light receiving surface of the imaging element 26 through the photography optical system (interchangeable lens unit 12), and the main body controller 28 controls discharging of the electric charge accumulated in the capacitor SC of each reading section 54 of the imaging element 26, reading of the signal corresponding to the electric charge accumulated in the capacitor SC, and the like. When a signal reading command is issued from the main body controller 28, the imaging element 26 sequentially outputs pixel signals (digital signals) to the main body controller 28. In the main body controller 28, image data of the subject image is generated by performing various kinds of image processing including the shading correction processing. It should be noted that the main body controller 28 is also able to selectively read signals from only desired pixels 40 among the plurality of pixels 40 of the imaging element 26.

<Shading Correction>

Figure 9:
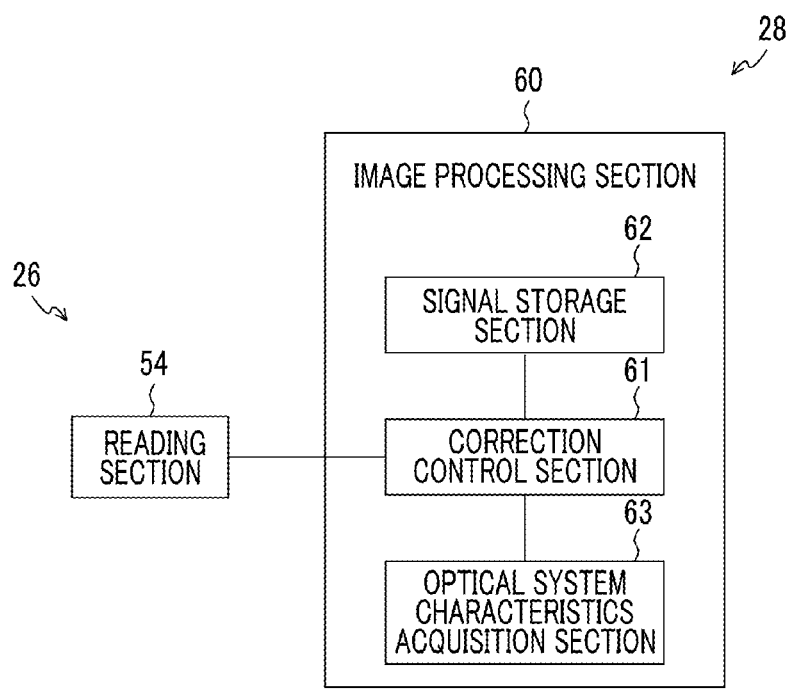
FIG. 9 is a block diagram illustrating a configuration of an image processing section (shading correction section) of a main body controller.

Next, the shading correction will be described in detail. FIG. 9 is a block diagram illustrating a configuration of the image processing section (shading correction section) 60 of the main body controller 28.

The image processing section 60 has a correction control section 61, a signal storage section 62, and an optical system characteristic acquisition section 63. Since the shading correction of the present example is performed by reading the signals from the pixels 40 and summing up the signals, "processing of reading image data from the imaging element 26 (processing of generating original image data)" and "shading correction processing" can be simultaneously and continuously performed. Accordingly, the image processing section 60 of the present example functions as a processing section for generating original image data of a subject image, and also functions as a shading correction processing section. It should be noted that it is not indispensible for the "processing of generating the original image data" and the "shading correction processing" to be performed by the same processing section, and each of the "processing of generating the original image data" and the "shading correction processing" may be performed by a separate processing section.

The signal storage section 62 has a configuration in which the signals read by the reading sections 54 of the imaging element 26 can be added and accumulated for each pixel, and includes an arbitrary memory member.

The optical system characteristic acquisition section 63 acquires shading characteristics of the interchangeable lens unit 12 (optical system). In the present example, the shading characteristics of the optical system are stored in the lens unit memory 24 (refer to FIG. 5). Thus, the optical system characteristic acquisition section 63 acquires information about the shading characteristics of the photography optical system, from the lens unit memory 24, through the lens unit controller 20, the lens unit input/output section 22, and the camera main body input/output section 30.

The correction control section 61 controls the signal storage section 62 and the optical system characteristic acquisition section 63, and controls the reading sections 54 of the imaging element 26, thereby generating the captured image data and performing shading correction of the captured image data. That is, the correction control section 61 reads signals (pixel values) from the respective pixels 40 through the reading sections 54 in a nondestructive manner, and stores the signals in the signal storage section 62, thereby generating the image data (original image data) of the subject image. Further, the correction control section 61 acquires the shading characteristics of the optical system through the optical system characteristic acquisition section 63, and performs shading correction on the basis of the shading characteristics. More specifically, the correction control section 61 sets a ratio of the number of operations for reading the signals of the pixel within the central portion 40 and the number of operations for reading the signals of the pixel within the peripheral portion 40 among the plurality of pixels 40 of the imaging element 26, on the basis of the shading characteristics, and the number of operations for reading the signals of the pixel within the peripheral portion 40 is set to be greater than the number of operations for reading the signals of the pixel within the central portion 40. The correction control section 61 reads the signals from the respective pixels 40 in accordance with the number of set reading operations, accumulates the signals in the signal storage section 62 for each pixel, and generates image data subjected to the shading correction from the signal of each pixel accumulated in the signal storage section 62.

FIG. 10 is a flowchart illustrating a flow of shading correction processing. An imaging method of the present example including the shading correction processing includes a step of acquiring shading characteristics of the interchangeable lens unit 12 (optical system), a step of reading the signals from the imaging element 26 (sensor section) and accumulating the signals in the signal storage section 62, and a step of generating the image data from the signal of each pixel accumulated in the signal storage section 62.

In other words, first, the optical system characteristic acquisition section 63 acquires the shading characteristics of the optical system (interchangeable lens unit 12) used in photography of a subject image (S11 of FIG. 10), and the correction control section 61 determines whether the shading correction for the captured image is necessary (S12). The determination as to whether the shading correction is necessary is performed on the basis of the acquired shading characteristics. For example, if a difference (difference in luminance) in degree of light attenuation between the pixel 40 within the central portion and the pixel 40 within the peripheral portion is greater than a predetermined threshold value, it can be determined that the shading correction is necessary, and if the difference is equal to or less than the threshold value, it can be determined that the shading correction is not necessary.

If it is determined that the shading correction is not necessary (N in S12), the shading correction processing (S13 and S14) to be described later is skipped, and the image data is sent to the next stage without performing shading correction thereon.

In contrast, if it is determined that the shading correction is necessary (Y in S12), the correction control section 61 calculates the number of operations for reading the signals from each pixel (particularly, the peripheral pixels) on the basis of the shading characteristics (S13). The number of operations for reading the signals for the shading correction can be set for each pixel, and the number of operations for reading the signals from each pixel 40 is set separately on the basis of the signal values (pixel values) from each pixel 40 within the central portion of the image. Accordingly, in shading correction for an image in which the effect of the shading is large and the difference in brightness (luminance value) between the central portion and the peripheral portion of the image is large and which is captured using the interchangeable lens unit 12 (optical system), the number of reading operations for the pixel 40 within the peripheral portion relatively increases as compared with the number of reading operations for the pixel 40 within the central portion. In addition, the number of reading operations for the shading correction is appropriately set for the pixel 40 which is relatively more affected by light attenuation caused by shading, but the number of reading operations for the shading correction can be set to "0 (zero)" for the pixel 40 (such as the pixel 40 within the central portion) which is relatively less affected by light attenuation caused by shading.

On the basis of the number of reading operations calculated in such a manner, the signals (pixel values) of each pixel 40 are read by the reading section 54 and the correction control section 61, summed up, and stored in the signal storage section 62. Thereby it is possible to obtain image data subjected to shading correction (S14).

As described above, a proportion of the number of operations for reading the signals from each pixel 40 is set depending on a proportion of the brightness (degree of light attenuation) based on shading. Thus, as compared with the number of operations for reading the signals from the pixel 40 within the central portion of the imaging element 26, the number of operations for reading the signals from the pixel 40 within the peripheral portion is increased. Then, the signal values, which are obtained through multiple reading operations, are summed up, and data (image data subjected to the shading correction) of the entire image is derived on the basis of the sum of the signal values. The number of operations for reading the signals from each pixel 40 is variable on the basis of lens characteristics (shading characteristics) of the photography optical system. Consequently, as described in the present example, even when the imaging device 1 employs an interchangeable lens system, it is possible to perform shading correction optimized for each interchangeable lens unit 12.

In the above-mentioned example, the lens unit memory 24 (refer to FIG. 3) functions as the lens characteristics storage section that stores the shading characteristics of the photography optical system. However, in the interchangeable-lens-type imaging device 1, an interchangeable lens unit 12 having unclear shading characteristics may be mounted on the camera main body 10. Thus, data of the shading characteristics of the photography optical system may not be provided in advance. Hereinafter, a description will be given of a configuration capable of coping with: a case where shading characteristics of the interchangeable lens unit 12 mounted on the camera main body 10 are acquired in advance and stored in the lens characteristics storage section (such as the lens unit memory 24); and a case where shading characteristics of the interchangeable lens unit 12 are unclear.

FIG. 11 is a flowchart illustrating a flow of processing of acquiring shading characteristics of an optical system.

First, the correction control section 61 (main body controller 28) determines whether or not a lens characteristics storage section storing the shading characteristics of the mounted interchangeable lens unit 12 (optical system) is present (S21 of FIG. 11). The correction control section 61 of the present example determines whether or not the lens characteristics storage section is present, through the optical system characteristic acquisition section 63, but a specific method of the determination is not particularly limited. Further, the lens characteristics storage section itself, which stores the shading characteristics of the optical system, may be present, but shading characteristics of the mounted interchangeable lens unit 12 may not be stored in the lens characteristics storage section. In this case, it may be determined that "there is no lens characteristics storage section". For example, the lens characteristics storage section (lens unit memory 24) may be provided in the interchangeable lens unit 12. In this case, the correction control section 61 (main body controller 28) may determine whether or not the lens characteristics storage section is present, through communication with the lens unit controller 20. Furthermore, the lens characteristics storage section may be provided in the camera main body 10. In this case, the correction control section 61 may determine whether or not the lens characteristics storage section is present, by acquiring information on a type of the mounted interchangeable lens unit 12 through communication with the lens unit controller 20 and checking whether or not shading characteristics corresponding to the type of the interchangeable lens unit 12 are held by the lens characteristics storage section. In addition, the lens characteristics storage section may be provided in external devices (such as a computer and a server). In this case, the correction control section 61 may acquires the type of the mounted interchangeable lens unit 12 through communication with the lens unit controller 20. Moreover, the correction control section 61 may determine whether or not the lens characteristics storage section is present, by checking whether or not shading characteristics corresponding to the acquired type of the interchangeable lens unit 12 can be acquired, by performing communication with the external devices through the input/output interface 32.

If it is determined that the lens characteristics storage section storing the shading characteristics is present (Y in S21), the correction control section 61 causes the optical system characteristic acquisition section 63 to read and acquire the shading characteristics of the mounted interchangeable lens unit 12 (optical system) from the lens characteristics storage section (S24).

In contrast, if it is determined that the lens characteristics storage section is absent (N in S21), the correction control section 61 (main body controller 28) acquires image data for calculation of the shading characteristics of the mounted interchangeable lens unit 12 (optical system) (S22), and calculates shading characteristics from the image data for calculation of the shading characteristics (S23). In this case, the correction control section 61 acquires the shading characteristics of the mounted interchangeable lens unit 12, on the basis of the signals which are read from the imaging element 26 (sensor section) for each pixel.

For example, the correction control section 61 (main body controller 28) controls the user interface 34 (refer to FIG. 3) such that it prompts a user to capture an image for calculation of the shading characteristics, and calculates the shading characteristics on the basis of the image data of the captured image for calculation of the shading characteristics. The image for calculation of the shading characteristics may be a single captured image, and may be a plurality of captured images. However, from the viewpoint of precisely acquiring shading characteristics, it is preferable that shading characteristics are calculated on the basis of a plurality of captured images. That is, the correction control section 61 may read the signals corresponding to a plurality of frames (a plurality of images) from the imaging element 26 (sensor section), and may acquire the shading characteristics on the basis of arithmetic mean values of the signals corresponding to the plurality of frames. By adding (summing up) the signal values (pixel values) corresponding to the plurality of frames for each pixel and dividing the sum of the signal values by the number of adding operations (the number of frames), the shading characteristics of the optical system can be precisely obtained. Further, the correction control section 61 (main body controller 28) may prompt a user to photograph a subject (for example, an entirely white subject) through the user interface 34, and may use photography data of such a uniform subject as the image data of the image for calculation of the shading characteristics.

For the case where it is determined that the lens characteristics storage section is absent, for example, a plurality of typical shading characteristics may be stored in the lens characteristics storage section provided in the camera main body 10, and the correction control section 61 (main body controller 28) prompts an operator to select the shading characteristics through the user interface 34.

Hereinafter, a description will be given of a typical embodiment of a series of processing relating to "image data acquisition" to "shading correction" to "post-processing and image data recording".

First Embodiment

FIG. 12 is a flowchart illustrating an image processing process according to the first embodiment.

The image processing process (imaging method) of the present embodiment includes: a process (original image data acquisition process) of acquiring image data of a subject image, a process (shading correction process) of performing shading correction processing on the image data, and a process (post-processing process) of performing another image processing on the image data subjected to the shading correction and recording the image data in a recording medium.

First, in the original image data acquisition process, the AE processing and the AF processing are performed (S31 of FIG. 12). These AE processing and AF processing are controlled by the main body controller 28 and performed by an arbitrary method, a shutter speed (exposure time period), an aperture value (F number), and an ISO sensitivity, and the like are set in accordance with a photography mode (such as an aperture priority mode, a shutter speed priority mode, a program AE mode, or a manual mode) selected by a user, and adjustment of an imaging position (focusing) is performed.

Then, the main body controller 28 determines whether the set shutter speed (sec) is equal to or faster than "1/focal length" (sec) (whether the following expression is satisfied: "shutter speed (sec)≤"1/focal length" (sec)") (S32), and determines a time period of the single exposure operation, on the basis of information of a focal length of the optical system. If the shutter speed is equal to or faster than "1/focal length", an effect of hand shaking is small, and image blurring in a captured image is less likely to occur. Accordingly, if the shutter speed (see) is equal to or less than "1/focal length (sec)", that is, if the shutter speed equal to or faster than "1/focal length" (Y in S32), the main body controller 28 performs exposure at the set shutter speed (S35). Then, the correction control section 61 reads signals (pixel values) of all pixels (all the central and peripheral pixels) of the imaging element 26 only once, and stores the signals in the signal storage section 62. In such a manner, original image data (image data before the shading correction) of the subject is acquired.

The "shutter speed" described herein is a time period (exposure time period) in which the imaging element 26 is exposed (perform exposure) to light passing through the optical system (interchangeable lens unit 12) at the time of photography. The shorter this time period (the smaller a value thereof), the faster the shutter speed, and the longer the time period (the larger the value), the slower the shutter speed. Further, the "focal length" is a numerical value based on millimeter (mm). For example, if the focal length is 200 mm, the "1/focal length" (sec) is "1/200" (sec).

In contrast, if the set shutter speed (sec) is greater than the "1/focal length" (sec), that is, if the shutter speed is slower than the "1/focal length" (N in S32), in order to prevent image blurring, the main body controller 28 adjusts the shutter speed (exposure time period) to "1/focal length" (sec), and performs exposure (S33). Since this adjusted exposure time period is shorter than an initial exposure time period (shutter speed) which is set in the AE processing, an amount of light (a brightness, a luminance, and a signal strength) of the entire image is less than expected. In order to compensate for loss in amount of light caused by the shutter speed adjustment, the correction control section 61 reads the signals of all the pixels 40 (central pixels and peripheral pixels) of the imaging element 26 multiple times, and adds (sums up) the signals of each pixel, and accumulates the signals in the signal storage section 62, thereby generating the original image data of the subject from the signals of each pixel accumulated in the signal storage section 62 (S34). That is, the signals of all the pixels 40 are read multiple times, and added for each pixel, and the added signals are accumulated in the signal storage section 62, thereby generating the image data from the signals of each pixel accumulated in the signal storage section 62. As a result, compensation for the loss in amount of light caused by the shutter speed adjustment is achieved. The number (the number of summation operations) of operations for reading the signals from each pixel is set to be equal to the number (the number corresponding to proper exposure) required for the pixel within the central portion 40 to be appropriately exposed, and is calculated on the basis of "the initially set shutter speed" and "1/focal length" (see).

The main body controller 28 is able to acquire the "focal length" of the mounted interchangeable lens unit 12 (optical system) in an arbitrary manner. For example, if the focal length is controlled in the camera main body 10 (main body controller 28), the main body controller 28 is able to acquire the focal length through access to the memory (not shown in the drawing) that stores the set focal length. Further, if the focal length is controlled in the interchangeable lens unit 12, the main body controller 28 is able to acquire the focal length through access to the lens unit controller 20.

In the above-mentioned original image data acquisition process (S31 to S36), the original image data of the subject is acquired through photography. Next, the shading correction is applied to the original image data.

Specifically, the correction control section 61 acquires "data about a ratio of the amount of light of the central portion to the amount of light of the peripheral portion" (shading characteristics) of the interchangeable lens unit (mounted lens) 12 mounted on the camera main body 10 (S37: shading characteristics acquisition step), and determines whether or not the shading correction is necessary, on the basis of the shading characteristics (S38). If it is determined that the shading correction is not necessary (N in S38), the shading correction to be described later is skipped (S39). In contrast, if it is determined that the shading correction is necessary (Y in S38), on the basis of the shading characteristics, the pixel value of the pixel within the peripheral portion is read multiple times, and the values are added (summed up), whereby the shading correction of the image data is performed (S39).

The specific technique of the above-mentioned processing of acquiring shading characteristics (S37) is not particularly limited. For example, on the basis of a processing flow shown in FIG. 11, it is possible to acquire the shading characteristics. Further, the specific techniques of the determination as to whether the shading correction is necessary (S38) and the shading correction (S39) are not particularly limited. For example, on the basis of a processing flow shown in FIG. 10, it is possible to perform such processing.

In the shading correction processing (S39), when the reading section 54 of the imaging element 26 reads the signals from the pixel 40 within the peripheral portion, the signals can be read from only the pixel 40 within the peripheral portion as a reading target. By partially reading the signals from only the pixel 40 within the peripheral portion as a reading target on the basis of the shading characteristics of the optical system, it is possible to shorten the reading time period, and it is possible to reduce heat which is likely to occur in the reading processing. As a result, it is possible to suppress an increase in noise.

In the present example, another image processing after the above-mentioned shading correction process (S37 to S39) is performed in the main body controller 28 (S40), the body controller 28 records the image data of the subject image, which is subjected to various kinds of image processing including the shading correction processing, in the recording medium (not shown in the drawing) (S41).

As described above, "the step of reading the signals from the imaging element 26 (sensor section) and accumulating the signals in the signal storage section 62, and "the step of generating the image data from the signal of each pixel accumulated in the signal storage section 62" are implemented by the above-mentioned steps S34, S36 and S39.

As described above, according to the present embodiment, the shutter speed (exposure time period) is set to be equal to "1/focal length" second or less than "1/focal length" second. Thus, it is possible to acquire high-image-quality image data in which blurring of the subject image is minimized.

In the above-mentioned steps S34 and S39, on the basis of the nondestructive reading method, the signals are read multiple times from the target pixel 40, and summed up, whereby a final pixel signal is acquired. That is, if the shutter speed is greater than "1/focal length" (see), the signals are read multiple times from all the pixels 40 of the imaging element 26 and summed up (S34). Further, as for a pixel in which a degree of light attenuation caused by shading, in order to perform shading correction, the signals are read and added to (summed up with) the original image data (pixel data) (S39). By calculating the pixel values (calculating the image data) through the repeated reading operations and summation, an SN ratio is improved. As a result, image quality of the image data is improved. That is, in the SN ratio, the signal value (S) corresponds to accumulated electric charge, and thus increases through summation. In contrast, a main component of the noise component (N) is random noise caused in an amplifier at the time of signal reading. Thus, as the number of adding operations increases, the signals become more averaged, and the proportion of the random noise gradually decreases.

Further, in a case of photography using an optical system in which the amount of light of the peripheral portion is rapidly lowered as compared with the amount of light of the central portion, an amount of a signal of the pixel 40 within the peripheral portion decreases. Thus, in the conventional shading correction performed by increasing a gain, amplifier noise (random noise) is dominant. Consequently, from the viewpoint of reducing a proportion of random noise, as a method of shading correction, the above-mentioned nondestructive reading method and summation method are superior to the conventional gain-increase method.

In addition, the repeated reading method and the method of acquiring the pixel signal (image data) through summation are not particularly limited. Summation (addition) of the signals based on a digital format is more convenient than that based on an analog format. Therefore, it is preferable that the signals, which are read from each pixel 40 in the analog format, are converted from the analog format into the digital format through AD conversion, and are summed up and stored.

Further, in the normal silicon photodiode CMOS, not only the effect of deterioration in sensitivity caused by the lens, but also the effect of deterioration of sensitivity of the sensor is large. Thus, there is a demand to perform shading correction in which characteristics of both the optical system and the imaging element are reflected. In contrast, in the organic CMOS-type imaging element 26 of the present embodiment, the shading correction can be performed on the basis of only optical system information. Thus, by acquiring only the shading characteristics of the optical system without consideration of characteristics of the sensor, high-accuracy shading correction can be performed and this is convenient. Further, in the organic CMOS-type imaging element 26, the effect of deterioration in sensitivity caused by the sensor and the effect of thermal noise are excessively small. Thus, it is possible to effectively prevent image quality from deterioration, through the nondestructive reading summation method.

Second Embodiment

In the above-mentioned first embodiment, the time period of the single exposure operation can be determined on the basis of whether or not the set shutter speed is equal to or faster than "1/focal length" second. However, in the present embodiment, the time period of the single exposure operation can be set in accordance with whether the subject is "a moving object" or "a stationary object".

FIG. 13 is a flowchart illustrating an image processing process according to the second embodiment. In the present embodiment, detailed description of processing the same as that of the above-mentioned first embodiment will be omitted.

Also in the present embodiment, in a manner similar to the first embodiment, the original image data acquisition process, the shading correction process, and the post-processing process are sequentially performed. In particular, the shading correction process (S58 to S60 of FIG. 13) and the post-processing process (S61 to S62) of the present embodiment are the same as the shading correction process (S37 to S39 of FIG. 12) and the post-processing process (S40 to S41) of the first embodiment.

However, in the original image data acquisition process of the present embodiment, after the AE processing and the AF processing (S51 of FIG. 13), the correction control section 61 (main body controller 28) acquires subject determination information (S52), and determines whether the subject is a moving object or a stationary object (S53).

The "subject determination information" described herein is information based on the determination as to whether the subject is "a moving object" or "a stationary object". It is preferable that the subject determination information is information that directly or indirectly indicates motion of the subject. However, the information is not necessarily rigorous information that indicates a motion of the subject. Accordingly, as the subject determination information, it is possible to use an arbitrary indicator that indicates possibility that the subject is a moving object or possibility that the subject is a stationary object. For example, the subject determination information may include various kinds of information such as a motion vector of the subject, a subject type, presence of a face image, and a photography mode. If it is determined that the subject is moving (and/or likely to move in the future) on the basis of the motion vector information, it can be determined that the subject is a moving object. If it is determined that the subject is stationary (and/or likely to be stationary in the future) on the basis of the motion vector information, it can be determined that the subject is a stationary object. Accordingly, for example, if it is determined that a subject type is a person, it can be determined that the subject is a moving object. In contrast, if it is determined that the subject type is a landscape, it can be determined that the subject is a stationary object. Further, if it is determined that the subject includes a face through facial recognition processing, it can be determined that the subject is a moving object. In contrast, if it is determined that the subject does not include a face, it can be determined that the subject is a stationary object. Furthermore, if the photography mode is a sports photography mode or the like, it can be determined that the subject is a moving object. In contrast, if the mode is a landscape photography mode or the like, it can be determined that the subject is a stationary object. In addition, the subject determination information is not limited to the information, a determination method may be based on another standard, and a method of acquiring subject information is also not limited.

If it is determined that the subject is a moving object, exposure is performed at the set shutter speed (S56), and the correction control section 61 reads the signals of all pixels (all the central and peripheral pixels) of the imaging element 26 only once (S57). Thereby, the original image data of the subject is acquired.

In contrast, if it is determined that the subject is a moving object, in order to prevent image blurring from occurring in the captured image, the correction control section 61 adjusts the shutter speed (exposure time period) to shorter one of "1/focal length" (sec) and "the exposure time period which is set through the AE/AF processing", and performs the exposure processing (S54). Then, the correction control section 61 reads the signals of all the pixels 40 (the central and peripheral pixels) of the imaging element 26 multiple times corresponding to an amount of exposure appropriate for the pixel 40 within the central portion (S55). Thereby, the original image data of the subject is acquired.

As for steps S54 and S55, for example, if "1/focal length" (see) is shorter than the set shutter speed (exposure time period), in the exposure photography based on "1/focal length" (see), an amount of light of the entire captured image is less than expected. Accordingly, in a case of satisfying the following expression: the "set exposure time period (shutter speed)" (sec)>"1/focal length" (sec), photography using exposure of "1/focal length" (sec) may be performed. In this case, the correction control section 61 reads the signals of all the pixels 40 (central and peripheral pixels) of the imaging element 26 multiple times and sums up the signals, thereby acquiring the original image data of the subject on the basis of the pixel values after summation. In contrast, if "the set exposure time period"≤"1/focal length" (sec), the correction control section 61 performs the exposure processing at the "set exposure time period (shutter speed)", and reads the signals of all pixels (all the central and peripheral pixels) of the imaging element 26 once.

After the original image data is acquired, the shading correction process (S58 to S60) and the image processing process (S61 to S62) are performed.

As described above, according to the present embodiment, presence or absence of the motion of the subject is inferred on the basis of the subject determination information, and the final exposure time period (shutter speed) is set. Hence, it is possible to acquire high-image-quality image data in which blurring of the subject image is minimized.

Third Embodiment

In the above-mentioned second embodiment, presence or absence of the motion of the subject is inferred on the basis of the subject determination information, and the time period of the single exposure operation can be set. However, in the present embodiment, the time period of the single exposure operation can be set in accordance with blurring (hand shaking) of the imaging device 1.

FIG. 14 is a flowchart illustrating an image processing process according to the third embodiment. In the present embodiment, detailed description of processing the same as those of the above-mentioned first and second embodiments will be omitted.

Also in the present embodiment, in a manner similar to the first and second embodiments, the original image data acquisition process, the shading correction process, and the post-processing process are sequentially performed. In particular, the shading correction process (S78 to S80 of FIG. 14) and the post-processing process (S81 to S82) of the present embodiment are the same as the shading correction process (S37 to S39 of FIG. 12 and S58 to S60 of FIG. 13) and the post-processing process (S40 to S41 of FIG. 12 and S61 to S62 of FIG. 13) of the first and second embodiments.

However, in the original image data acquisition process of the present embodiment, after the AE processing and the AF processing (S71 of FIG. 14), the correction control section 61 acquires main body blurring information (S72), and determines whether or not the amount of blurring in the photography of the imaging device 1 is large (S73).

The "main body blurring information" described herein is information based on determination as to whether or not blurring of the imaging device 1 is information based on determination as to whether or not the amount of blurring of the imaging device 1 is large. The main body blurring information may be information that directly or indirectly indicates blurring of the imaging device 1. The information is not necessarily rigorous information about blurring of the imaging device 1. In addition, as the main body blurring information, an arbitrary indicator indicating the magnitude of the amount of blurring of the imaging device 1 may be used. For example, a gyro sensor (not shown in the drawing) or the like provided in the camera main body 10 may measure an amount of movement (amount of blurring) of the imaging device 1 (the camera main body 10, and the interchangeable lens unit 12), and the measured amount of blurring may be employed as the main body blurring information. If the measured amount of blurring is greater than a predetermined value, it may be determined that the amount of blurring of the imaging device 1 is large. In contrast, if the measured amount of blurring is equal to or less than the predetermined value, it may be determined that the amount of blurring of the imaging device 1 is not large. In addition, the main body blurring information is not limited to the information, a determination method may be based on another standard, and a method of acquiring main body blurring information is also not limited.

If it is determined that blurring in photography of the imaging device 1 is not large (N in S73), the main body controller 28 performs the exposure processing at the set shutter speed (S76), and the correction control section 61 reads the signals of all pixels (all the central and peripheral pixels) of the imaging element 26 only once (S77). Thereby, the original image data of the subject is acquired.

In contrast, if it is determined that blurring in photography of the imaging device 1 is large (Y in S73), in order to prevent image blurring from occurring, the correction control section 28 adjusts the shutter speed (exposure time period) to shorter one of "1/focal length" (sec) and "the exposure time period which is set through the AE/AF processing", and performs the exposure processing (S74). Then, the correction control section 61 reads the signals of all the pixels 40 (the central and peripheral pixels) of the imaging element 26 multiple times corresponding to an amount of exposure appropriate for the pixel 40 within the central portion (S75). For example, if "1/focal length" (sec) is shorter than the set shutter speed (exposure time period), in the exposure photography based on "1/focal length" (sec), an amount of light of the entire captured image is less than expected. Accordingly, in a case of satisfying the following expression: the "set exposure time period (shutter speed)" (sec)>"1/focal length" (sec), photography using exposure of "1/focal length" (see) may be performed. In this case, the correction control section 61 reads the signals of all the pixels 40 (central and peripheral pixels) of the imaging element 26 multiple times and sums up the signals, thereby acquiring the original image data of the subject on the basis of the pixel values after summation. In contrast, if "the set exposure time period"≤"1/focal length" (sec), the correction control section 61 performs the exposure processing at the "set exposure time period (shutter speed)", and reads the signals of all pixels (all the central and peripheral pixels) of the imaging element 26 once. Thereby, the original image data of the subject is acquired.

After the image data of the subject image is acquired, the shading correction process (S78 to S80) and the image processing process (S81 to S82) are performed.

As described above, according to the present embodiment, a magnitude of the motion (blurring) at the time of photography of the imaging device 1 is inferred on the basis of the main body blurring information, and the exposure time period is set. Hence, it is possible to acquire high-image-quality image data in which blurring of the subject image is minimized.

Fourth Embodiment

In the shading correction process of the above-mentioned first embodiment, a plurality of operations for reading the signals (pixel values) of the pixel 40 within the central portion is not performed. However, in the shading correction process of the present embodiment, the signals of the pixel 40 within the central portion are read multiple times.

FIG. 15 is a flowchart illustrating an image processing process according to the fourth embodiment. In the present embodiment, detailed description of processing the same as that of the above-mentioned first embodiment will be omitted.

Also in the present embodiment, in a manner similar to the first embodiment, the original image data acquisition process, the shading correction process, and the post-processing process are sequentially performed. In particular, the original image data acquisition process (S91 to S96 of FIG. 15) and the post-processing process (S100 to S101) of the present embodiment are the same as the original image data acquisition process (S31 to S36 of FIG. 12) and post-processing process (S40 to S41) of the first embodiment.

However, in the shading correction process of the present embodiment, the correction control section 61 acquires "data about a ratio of the amount of light of the central portion to the amount of light of the peripheral portion" (shading characteristics) of the interchangeable lens unit 12 (S97). If it is determined that the shading correction is necessary (Y in S98), the signals are read multiple times from not only the pixel 40 within the peripheral portion but also the pixel 40 within the central portion, and the shading correction is performed (S99). In contrast, if it is determined that the shading correction is not necessary (N in S98), the shading correction processing is skipped (S99). This is the same as that of the first embodiment.

In the shading correction processing (S99), the correction control section 61 reads the pixel values of the pixel 40 within the central portion and the pixel 40 within the peripheral portion once or multiple times on the basis of the shading characteristics, calculates the signal of the pixel 40 within the central portion through arithmetic mean, and calculates the signal of the pixel 40 within the peripheral portion through summation (addition), thereby performing the shading correction. Consequently, in the image data after the shading correction, data of the pixel within the central portion is based on an arithmetic mean value of the signals accumulated in the signal storage section 62, and data of the pixel within the peripheral portion is based on a sum of the signals accumulated in the signal storage section 62.

In the shading correction processing, the numbers of operations for reading the pixel values of the pixel 40 within the central portion and the pixel 40 within the peripheral portion are set on the basis of the shading characteristics, where the arithmetic mean operation of the signals of the pixel 40 within the central portion are performed, and the addition operation of the signals of the pixel 40 within the peripheral portion are performed. Further, in the present example, the signal values, which are read through the shading correction (S99), are added to the original image data which is acquired in the original image data acquisition process (S91 to S96). Hence, in consideration of the original image data, the number of operations for reading the signals in the shading correction (S99) can be set.

As described above, in the shading correction (S99) of the present example, the pixel value of the pixel 40 within the central portion are calculated through arithmetic mean. Therefore, a noise component included in the pixel value of the pixel 40 within the central portion is also averaged. As a result, the noise component is reduced, and thus it is possible to improve image quality of the central portion of the image.

As described above, according to the present embodiment, in the shading correction processing, the signals of the pixel 40 within the peripheral portion are summed up so as to compensate for deterioration in image quality caused by shading, the final pixel value is obtained, and thus the effect of the shading can be reduced. In contrast, the noise component of the pixel value of the pixel 40 within the central portion is minimized through an arithmetic mean operation.

Consequently, it is possible to further effectively improve image quality of the entire image.

Other Embodiments

Aspects according to the present invention are not limited to the above-mentioned embodiments. Further, the above-mentioned embodiments may be appropriately combined. For example, some of the following embodiments may be arbitrarily combined: "an embodiment (first embodiment) in which the exposure time period is set on the basis of the setting shutter speed and the focal length"; "an embodiment (second embodiment) in which the exposure time period is set in accordance with the motion of the subject"; "an embodiment (third embodiment) in which the exposure time period is set in accordance with the motion of the imaging device 1"; and "an embodiment (fourth embodiment) in which the signal of the pixel within the central portion is calculated through arithmetic mean operation of the signal values which are repeatedly read in the shading correction".

The above-mentioned configurations and functions are appropriately implemented by arbitrary hardware, software, or a combination of both thereof. For example, the present invention can also be applied to a program which causes a computer to execute the above-mentioned processing step (processing order), a computer-readable recording medium (non-transitory recording medium) in which such a program is recorded, or a computer in which such a program can be installed.

Aspects, to which the present invention can be applied, are not limited to the digital camera and the computer (server). The present invention can also be applied to not only cameras that mainly have an imaging function but also mobile equipment that has not only an imaging function but also functions (a phone call function, a communication function, or other computer functions) other than the imaging function. Examples of the embodiments, to which the present invention can be applied, include a mobile phone having a camera function, a smartphone, a personal digital assistant (PDA), and a portable game machine. Hereinafter, an example of a smartphone, to which the present invention is applicable, will be described.

<Configuration of Smartphone>

Figure 16:
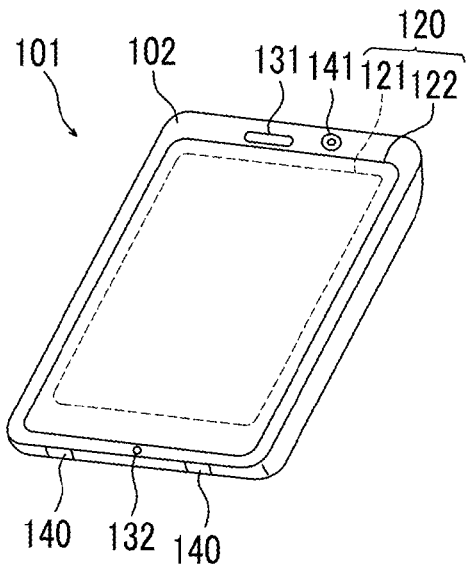
FIG. 16 is a diagram illustrating an appearance of a smartphone as an embodiment of an imaging device.

FIG. 16 is a diagram illustrating an appearance of a smartphone 101 as an imaging device according to the embodiment of the present invention. The smartphone 101 shown in FIG. 16 includes: a housing 102 that has a flat plate shape; a display panel 121 as a display section on one side of the housing 102; and a display input section 120 into which an operation panel 122 as an input section is integrated. Further, the housing 102 includes a speaker 131, a microphone 132, operation sections 140, and a camera section 141. It should be noted that the configuration of the housing 102 is not limited to this. For example, it may be possible to adopt a configuration in which the input section and the display section are independently provided, or it may be possible to adopt a configuration having a slide mechanism or a folded structure.

Figure 17:
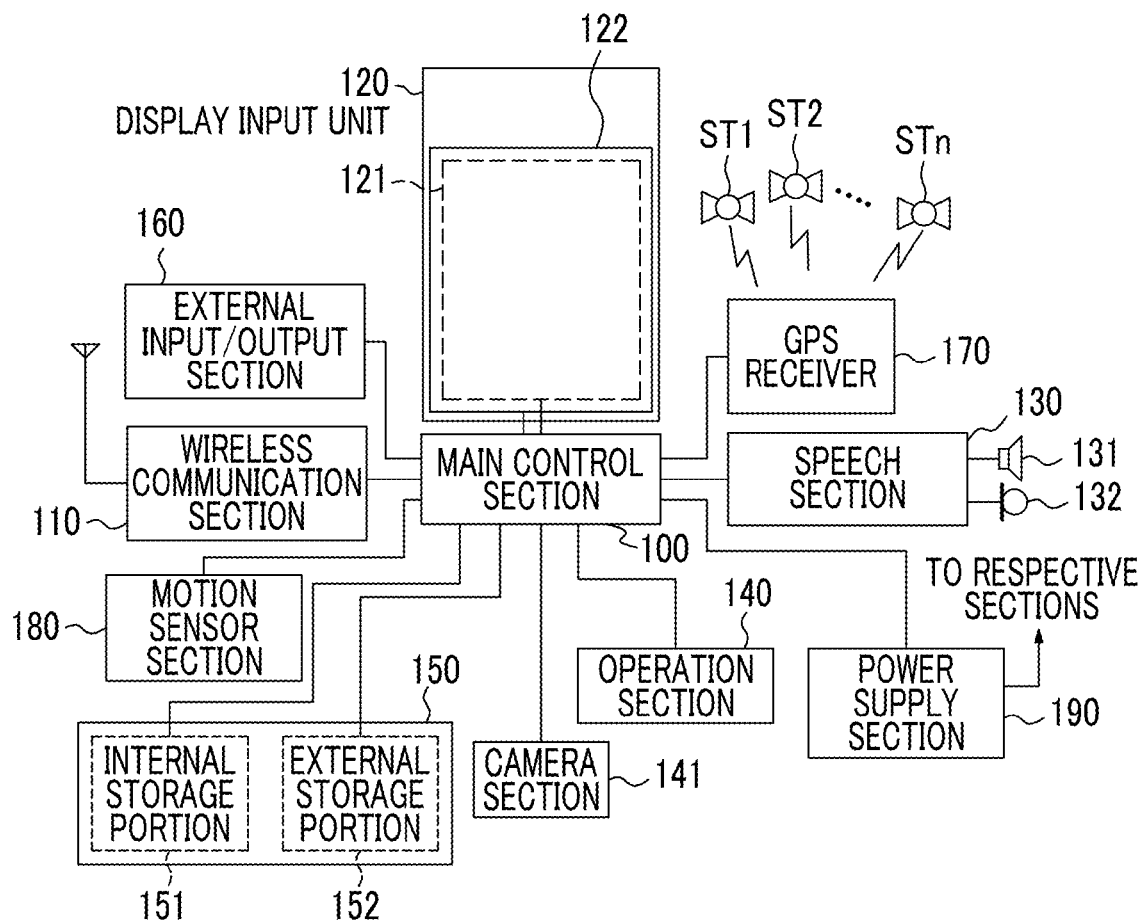
FIG. 17 is a block diagram illustrating a configuration of the smartphone shown in FIG. 16.

FIG. 17 is a block diagram illustrating a configuration of the smartphone 101 shown in FIG. 16. As shown in FIG. 17, as main components of the smartphone 101, there are a wireless communication section 110, a display input section 120, a speech section 130, operation sections 140, a camera section 141, a storage section 150, an external input/output section 160, a global positioning system (GPS) receiver 170, a motion sensor section 180, a power supply section 190, and a main control section 100. Further, as the main function of the smartphone 101, there is provided a wireless communication function for performing mobile wireless communication with a base station device through a mobile communication network.

The wireless communication section 110 performs wireless communication with the base station device, which is connected to the mobile communication network, in accordance with an instruction of the main control section 100. Using this wireless communication, various kinds of file data such as audio data and image data, e-mail data, and the like are transmitted and received, and web data, streaming data, and the like are received.

The display input section 120 is a so-called touch panel, and includes the display panel 121 and the operation panel 122. The touch panel displays image (still image and moving image) information, text information, or the like so as to visually transfer the information to a user in accordance with control of the main control section 100, and detects a user operation on the displayed information.

The display panel 121 uses an LCD, an organic electroluminescence display (OELD), or the like as a display device. The operation panel 122 is a device that is provided in a state where an image displayed on a display screen of the display panel 121 is visible and that detects a single pair of coordinates or a plurality of pairs of coordinates at which an operation is performed by a user's finger or a stylus. When the device is operated by a user's finger or a stylus, the operation panel 122 outputs a detection signal, which is generated due to the operation, to the main control section 100. Subsequently, the main control section 100 detects an operation position (coordinates) on the display panel 121, on the basis of the received detection signal.

The display panel 121 and the operation panel 122 of the smartphone 101, which is exemplified in FIG. 16 as the imaging device according to the embodiment of the present invention, are integrated, constitute the display input section 120, and are disposed such that the operation panel 122 completely covers the display panel 121. When the arrangement is adopted, the operation panel 122 may have a function of also detecting a user operation in a region outside the display panel 121. In other words, the operation panel 122 may include a detection region (hereinafter referred to as a "display region") for a part which overlaps with the display panel 121 and a detection region (hereinafter referred to as a "non-display region") for the other part at the outer edge which does not overlap with the display panel 121.

It should be noted that a size of the display region and a size of the display panel 121 may completely coincide with each other, but it is not always necessary for both to coincide with each other. Further, the operation panel 122 may include two sensing regions of the outer edge part and the other inside part. Furthermore, a width of the edge part is appropriately designed depending on a size of the housing 102 and the like. In addition, examples of the position detection method adopted by the operation panel 122 may include a matrix switch method, a resistance film method, a surface elastic wave method, an infrared method, an electromagnetic induction method, and an electrostatic capacitance method, and the like, and any method thereof may be adopted.

The speech section 130 includes a speaker 131 and a microphone 132. The speech section 130 converts a sound of a user, which is input through the microphone 132, into sound data, which can be processed in the main control section 100, and outputs the data to the main control section 100, or decodes sound data, which is received by the wireless communication section 110 or the external input/output section 160, and outputs the data from the speaker 131. Further, as shown in FIG. 16, for example, the speaker 131 can be mounted on the same surface as the surface on which the display input section 120 is provided, and the microphone 132 can be mounted on a side surface of the housing 102.

The operation section 140 is a hardware key using a key switch or the like, and receives an instruction from a user. For example, as shown in FIG. 16, the operation sections 140 are button type switches which are mounted on the side surface of the housing 102 of the smartphone 101. Each switch is turned on if it is pressed by a finger or the like, and is turned off due to restoring force of a spring if the finger is released.

The storage section 150 stores a control program and control data of the main control section 100, application software, address data in which names, phone numbers, and the like of communication partners are associated, received and transmitted e-mail data, web data which is downloaded by web browsing, and downloaded contents data, and temporarily stores streaming data and the like. Further, the storage section 150 is constituted of an internal storage portion 151, which is built into the smartphone, and an external storage portion 152 which has a removable external memory slot. In addition, each of the internal storage section 151 and the external storage section 152 constituting the storage section 150 is implemented by using a storage medium such as a flash memory type, a hard disk type, a multimedia card micro type, a card type memory (such as a MicroSD (registered trademark) memory), a random access memory (RAM), or a read only memory (ROM).

The external input/output section 160 serves as an interface with all external devices connected to the smartphone 101. The external input/output section 160 is directly or indirectly connected to other external devices through communication (such as universal serial bus (USB) or IEEE 1394), networks (such as the Internet, wireless LAN, Bluetooth (registered trademark), radio frequency identification (RFID), infrared communication (Infrared Data Association: IrDA) (registered trademark), ultra wideband (UWB) (registered trademark), and ZigBee (registered trademark)), or the like.

Examples of the external devices connected to the smartphone 101 include a wired/wireless headset, a wired/wireless external charger, a wired/wireless data port, a memory card which is connected through a card socket, a subscriber identity module (SIM) or user identity module (UIM) card, external audio and video devices which are connected through audio and video input/output (I/O) terminals, external audio and video devices which are connected in a wireless manner, a smartphone which is connected in a wired or wireless manner, a personal computer which is connected in a wired or wireless manner, a PDA which is connected in a wired or wireless manner, earphones, and the like. The external input/output section 160 may be configured to transfer the data, which is transmitted from such external devices, to the components within the smartphone 101, and to transmit the data within the smartphone 101 to the external devices.

The GPS receiver 170 receives a plurality of GPS signals, which are transmitted from GPS satellites ST1, ST2 to STn, in accordance with instructions of the main control section 100, executes positioning calculation processing based on the received plural GPS signals, and detects a position specified by a latitude, a longitude, and an altitude of the smartphone 101. The GPS receiver 170 may detect the position by using position information if it is possible to acquire the position information from the wireless communication section 110 and/or the external input/output section 160 (for example, wireless LAN).

The motion sensor section 180 includes, for example, a triaxial acceleration sensor, and detects physical movement of the smartphone 101, in accordance with an instruction of the main control section 100. By detecting physical movement of the smartphone 101, an acceleration and a direction of the movement of the smartphone 101 are detected. The detection result is output to the main control section 100.

The power supply section 190 supplies the respective sections of the smartphone 101 with electric power, which is stored in a battery (not shown), in accordance with an instruction of the main control section 100.

The main control section 100 includes a micro processor, and integrally controls the respective sections of the smartphone 101 by performing an operation on the basis of control data or a control program stored in the storage section 150. Further, the main control section 100 has an application processing function and a mobile communication control function of controlling the respective sections of a communication system in order to perform data communication and sound communication through the wireless communication section 110.

The application processing function is implemented by an operation of the main control section 100 using application software stored in the storage portion 150. Examples of the application processing function include: an infrared communication function of performing data communication with other devices by controlling the external input/output section 160; an e-mail function of transmitting and receiving e-mails; a web browsing function of browsing web pages; and the like.

Further, the main control section 100 has an image processing function of displaying a video on the display input section 120 and the like, on the basis of image data (still image and moving image data) such as received data and downloaded streaming data. The image processing function means a function of causing the main control section 100 to decode the image data, apply image processing to the decoding result, and display an image, which is obtained through the image processing, on the display input section 120.

Furthermore, the main control section 100 executes display control for the display panel 121 and operation detection control to detect the user operation through the operation sections 140 and the operation panel 122.

Through execution of the display control, the main control section 100 displays an icon for activating application software and a window for displaying a software key such as a scroll bar or creating an e-mail. It should be noted that the scroll bar means a software key for receiving an instruction to move a display portion of an image on a large image which cannot be entirely shown in the display region of the display panel 121.

Further, through execution of the operation detection control, the main control section 100 detects the user operation performed through the operation section 140, receives an operation performed on the icon or a text input performed in an input field of the window through the operation panel 122, or receives a request to scroll a displayed image through the scroll bar.

Furthermore, the main control section 100 has a touch panel control function performed through execution of the operation detection control. The function determines whether the operation position of the operation panel 122 corresponds to the overlapping part (display region) which overlaps with the display panel 121 or the other part (non-display region) at the outer edge which does not overlap with the display panel 121, and controls the display position of the software key or the sensing region of the operation panel 122.

In addition, the main control section 100 may detect a gesture operation performed on the operation panel 122, and may execute a preset function in response to the detected gesture operation. The gesture operation is not a simple touch operation used in the past. The gesture operation means an operation for drawing a locus with a finger or the like, an operation of specifying a plurality of positions at the same time, or an operation of drawing loci from a plurality of positions to at least one position as a combination of the above-mentioned operations.

The camera section 141 is a digital camera for performing electronic photography by using the imaging element such as a CMOS. Further, the camera section 141 is able to convert image data, which is obtained through image capturing, into compressed image data such as data of a JPEG under control of the main control section 100, and to record the data in the storage section 150 or to output the data through the external input/output section 160 or the wireless communication section 110. As shown in FIG. 16, in the smartphone 101, the camera section 141 is mounted on the same side as the display input section 120. However, the mounting position of the camera section 141 is not limited to this. The camera section 141 may be mounted on not the front side of the housing 102 on which the display input section 120 is provided but the rear side of the housing 102, or a plurality of camera sections 141 may be mounted on the housing 102. In addition, in the case where the plurality of camera sections 141 is mounted, photography may be performed using a single camera section 141 by selecting the camera section 141 for the photography, or photography may be performed using the plurality of camera sections 141 at the same time.

Further, the camera section 141 can be used in various functions of the smartphone 101. For example, an image, which is acquired by the camera section 141, may be displayed on the display panel 121, and an image captured by the camera section 141 as one of the operation inputs of the operation panel 122 may be used. Further, when the GPS receiver 170 detects a position, the GPS receiver 170 may detect the position with reference to an image obtained from the camera section 141. Further, it may be possible to determine a direction of an optical axis of the camera section 141 of the smartphone 101 or determine a current user environment, using the GPS receiver 170 in a combination with the triaxial acceleration sensor or without using the triaxial acceleration sensor, with reference to the image acquired from the camera section 141. Needless to say, the image acquired from the camera section 141 may be used in the application software.

Otherwise, the position information acquired by the GPS receiver 170, the sound information acquired by the microphone 132 (or text information obtained through sound text conversion performed by the main control section or the like), the posture information acquired by the motion sensor section 180, and the like may be added to the image data of the still image or the moving image, and the data obtained through the addition may be recorded in the storage section 150, or may be output through the external input/output section 160 or the wireless communication section 110.

In the above-mentioned smartphone 101, as the CMOS imaging element of the camera section 141, an organic CMOS-type imaging element (refer to FIGS. 6 to 8) may be used. Further, for example, the above-mentioned image processing section 60 (the correction control section 61, the signal storage section 62, and the optical system characteristic acquisition section 63: refer to FIG. 9) can be implemented by the main control section 100.

EXPLANATION OF REFERENCES

1: imaging device
10: camera main body
10-1: mount
10-2: finder window
10-3: shutter release button
10-4: shutter speed dial
10-5: exposure correction dial
10-6: eyepiece section
10-7: OK button
10-8: arrow key
10-9: liquid crystal monitor
12: interchangeable lens unit
16: lens
17: diaphragm
18: optical system operation section
20: lens unit controller
22: lens unit input/output section
24: lens unit memory
26: imaging element
28: main body controller
30: camera main body input/output section
32: input/output interface
34: user interface
36-1: vertical driver
36-2: timing generator
36-3: signal processing section
36-4: horizontal driver
36-6: serial conversion section
38: pixel region
40: pixel
40B: B pixel
40G: G pixel
40R: R pixel
42: color filter
44: intermediate layer
46: common electrode
48: organic layer
50: individual electrode
52: via-plug
53: insulation layer
54: reading section
56: CMOS substrate
60: image processing section
61: correction control section
62: signal storage section
63: optical system characteristic acquisition section
100: main control section
101: smartphone
102: housing
110: wireless communication section
120: display input section
121: display panel
122: operation panel
130: speech section
131: speaker
132: microphone
140: operation section
141: camera section 150: storage section
151: internal storage section
152: external storage section
160: external input/output section
170: GPS receiving section
180: motion sensor section
190: power supply section

What is claimed is:

1. An imaging device that is equipped with an interchangeable optical system to generate image data of an image of received light, the imaging device comprising:
   a sensor section that includes a plurality of pixels generating signals corresponding to the light received through the optical system and that has a configuration allowing nondestructive reading of the signals generated by the plurality of pixels;
   a reading section that reads the signals of the respective pixels from the sensor section in a nondestructive manner;
   a signal storage section that is able to add up and store the signals of the respective pixels which are read by the reading section; and
   a control section that acquires shading characteristics of the optical system and controls the reading section and the signal storage section,
   wherein each of the plurality of pixels has an organic layer including a photoelectric conversion layer which generates electric charge corresponding to received light, and
   wherein the control section sets a ratio of a number of operations for reading the signals of a pixel within a central portion among the plurality of pixels to a number of operations for reading the signals of a pixel within a peripheral portion, on the basis of the shading characteristics, performs the setting such that the number of operations for reading the signals of the pixel within the peripheral portion is greater than the number of operations for reading the signals of the pixel within the central portion, and generates the image data from the signals of the respective pixels stored in the signal storage section.

2. The imaging device according to claim 1, wherein the control section adds the signals of the pixel within the central portion for each of the pixels which are read multiple times, stores the signals in the signal storage section, and generates the image data from the signals of the respective pixels stored in the signal storage section.

3. The imaging device according to claim 1, wherein in the image data, data of each pixel within the central portion is based on an arithmetic mean value of the signals stored in the signal storage section, and data of each pixel within the peripheral portion is based on a sum of the signals stored in the signal storage section.

4. The imaging device according to claim 1, wherein the control section acquires the shading characteristics from a lens characteristics storage section which stores the shading characteristics of the optical system.

5. The imaging device according to claim 1, wherein the control section acquires the shading characteristics on the basis of the signals each of which is read from the sensor section for each pixel.

6. The imaging device according to claim 5, further comprising a user interface,
   wherein the control section controls the user interface such that the user interface prompts a user to capture an image for calculation of the shading characteristics, and calculates the shading characteristics on the basis of the image data of the image for calculation of the shading characteristics.

7. The imaging device according to claim 5, wherein the control section reads the signals of a plurality of frames from the sensor section, and acquires the shading characteristics on the basis of the arithmetic mean values of the signals corresponding to the plurality of frames.

8. An imaging method of generating image data of an image of light received through an imaging device including a sensor section that includes a plurality of pixels generating signals corresponding to the light received through an interchangeable optical system and that has a configuration allowing nondestructive reading of the signals generated by the plurality of pixels, a reading section that reads the signals of the respective pixels from the sensor section, and a signal storage section that is able to add up and store the signals of the respective pixels which are read by the reading section, the imaging method comprising:
   a step of acquiring shading characteristics of the optical system;
   a step of reading the signals from the sensor section and storing the signals in the signal storage section; and
   a step of generating the image data from the signals of the respective pixels stored in the signal storage section,
   wherein each of the plurality of pixels has an organic layer including a photoelectric conversion layer which generates electric charge corresponding to received light, and
   wherein a ratio of a number of operations for reading the signals of a pixel within a central portion among the plurality of pixels to a number of operations for reading the signals of a pixel within a peripheral portion is set on the basis of the shading characteristics, and the setting is made such that the number of operations for reading the signals of the pixel within the peripheral portion is greater than the number of operations for reading the signals of the pixel within the central portion.

* * * * *